(12) United States Patent
Yeh et al.

(10) Patent No.: US 8,381,119 B2
(45) Date of Patent: Feb. 19, 2013

(54) INPUT DEVICE FOR PICTOGRAPHIC LANGUAGES

(75) Inventors: Chan H. Yeh, Los Altos, CA (US); Yong L. Yeh, Foster City, CA (US)

(73) Assignee: Ideographix, Inc., Sunnyvale, CA (US)

( * ) Notice: Subject to any disclaimer, the term of this patent is extended or adjusted under 35 U.S.C. 154(b) by 434 days.

(21) Appl. No.: 12/685,623

(22) Filed: Jan. 11, 2010

(65) Prior Publication Data

US 2011/0173558 A1    Jul. 14, 2011

(51) Int. Cl.
*G06F 3/048* (2006.01)
(52) U.S. Cl. ......... 715/773; 345/168; 345/171; 345/173
(58) Field of Classification Search .................. 715/773; 345/173, 171, 168
See application file for complete search history.

(56) References Cited

U.S. PATENT DOCUMENTS

| | | | |
|---|---|---|---|
| 3,665,450 A | | 5/1972 | Leban |
| 3,820,644 A | | 6/1974 | Yeh |
| 3,927,752 A | * | 12/1975 | Jones et al. ................... 400/487 |
| 4,066,350 A | * | 1/1978 | Koide et al. ................. 353/27 R |
| 4,079,482 A | | 3/1978 | Yeh |
| 4,187,031 A | * | 2/1980 | Yeh ................................. 400/83 |
| 4,365,235 A | | 12/1982 | Greanias et al. |
| 4,379,288 A | | 4/1983 | Leung et al. |
| 4,462,703 A | | 7/1984 | Lee |
| 4,669,901 A | | 6/1987 | Feng |
| 4,684,926 A | | 8/1987 | Yong-Min |
| 4,718,102 A | | 1/1988 | Crane et al. |
| 4,722,621 A | | 2/1988 | Johnson |
| 4,829,583 A | | 5/1989 | Monroe et al. |
| 4,868,913 A | | 9/1989 | Tse-Kai |
| 4,920,492 A | | 4/1990 | Wang |
| 4,980,840 A | * | 12/1990 | Yin et al. ....................... 715/210 |
| 5,027,406 A | * | 6/1991 | Roberts et al. ................ 704/244 |
| 5,164,900 A | * | 11/1992 | Bernath ........................ 715/264 |
| 5,212,638 A | | 5/1993 | Bernath |
| 5,213,422 A | | 5/1993 | Garfinkle |
| 5,220,639 A | | 6/1993 | Lee |
| 5,475,767 A | | 12/1995 | Du |
| 5,602,960 A | | 2/1997 | Hon et al. |
| 5,918,206 A | * | 6/1999 | Wong et al. ................... 704/271 |
| 6,016,142 A | * | 1/2000 | Chang et al. .................. 715/763 |

(Continued)

OTHER PUBLICATIONS

Touch Screen Keyboard (VNT-K330)—China Keyboard, Speed dome Camera Control Keyboard, Cctv Accessory in Surveillance, Control & Protection.mht, downloaded from http://www.made-in-china.com on May 29, 2009.

(Continued)

*Primary Examiner* — Patrick Riegler
(74) *Attorney, Agent, or Firm* — Knobbe, Martens, Olson & Bear LLP

(57) ABSTRACT

In some embodiments, input devices and related systems and methods for electronically inputting characters of a pictographic language are disclosed. In one embodiment, an input device for a pictographic language includes a touchscreen display, and a display controller programmed to display a first arrangement including a first set of characters of a pictographic language on the touchscreen display. The first arrangement includes a plurality of regions, each of which contains a plurality of characters of the first set of characters of the pictographic language. The touchscreen display may be programmed to receive selection of one of the regions, and to receive selection of one of the characters in the selected region after receiving the selection of the region. Advantageously, the input device can be effectively used by both non-speakers and language learners as well as native speakers.

45 Claims, 15 Drawing Sheets

U.S. PATENT DOCUMENTS

| | | |
|---|---|---|
| 6,073,146 A | 6/2000 | Chen |
| 6,163,767 A | 12/2000 | Tang et al. |
| 6,169,538 B1 * | 1/2001 | Nowlan et al. ............... 345/168 |
| 6,271,835 B1 * | 8/2001 | Hoeksma ..................... 345/168 |
| 6,281,884 B1 * | 8/2001 | Chang et al. ................. 345/171 |
| 6,281,886 B1 | 8/2001 | Ranieri |
| 6,307,541 B1 | 10/2001 | Ho et al. |
| 6,604,878 B1 * | 8/2003 | Wong ............................ 400/484 |
| 6,801,659 B1 | 10/2004 | O'Dell |
| 6,809,725 B1 | 10/2004 | Zhang |
| 7,257,528 B1 | 8/2007 | Ritchie et al. |
| 7,424,156 B2 | 9/2008 | Huang |
| 7,479,949 B2 | 1/2009 | Jobs et al. |
| 2002/0168208 A1 | 11/2002 | Lee |
| 2002/0172538 A1 | 11/2002 | Hwa |
| 2003/0095105 A1 | 5/2003 | Vaananen |
| 2003/0106781 A1 | 6/2003 | Ye |
| 2004/0119750 A1 | 6/2004 | Harrison |
| 2004/0183833 A1 | 9/2004 | Chua |
| 2004/0218963 A1 | 11/2004 | Van Diepen et al. |
| 2004/0240924 A1 | 12/2004 | Ye |
| 2005/0168446 A1 | 8/2005 | Majdoub |
| 2006/0077179 A1 | 4/2006 | Hsu et al. |
| 2006/0085757 A1 | 4/2006 | Andre et al. |
| 2006/0097994 A1 * | 5/2006 | Miyakoshi ................... 345/173 |
| 2006/0279924 A1 | 12/2006 | Richardson et al. |
| 2007/0013662 A1 | 1/2007 | Fauth |
| 2007/0052682 A1 | 3/2007 | Kang et al. |
| 2007/0247442 A1 | 10/2007 | Andre et al. |
| 2007/0273656 A1 | 11/2007 | Chang et al. |
| 2008/0016460 A1 | 1/2008 | Park |
| 2008/0024449 A1 * | 1/2008 | Pletikosa et al. ............. 345/168 |
| 2008/0024451 A1 * | 1/2008 | Aimi et al. .................... 345/168 |
| 2008/0046496 A1 | 2/2008 | Kater |
| 2008/0082934 A1 | 4/2008 | Kocienda et al. |
| 2008/0183460 A1 * | 7/2008 | Baker et al. ....................... 704/3 |
| 2008/0225006 A1 * | 9/2008 | Ennadi ......................... 345/171 |
| 2008/0301575 A1 | 12/2008 | Fermon |
| 2008/0316180 A1 | 12/2008 | Carmody et al. |
| 2009/0116745 A1 | 5/2009 | Kawano et al. |
| 2009/0179778 A1 * | 7/2009 | Phillips et al. ................. 341/22 |
| 2010/0231523 A1 * | 9/2010 | Chou ............................ 345/171 |
| 2011/0068956 A1 * | 3/2011 | Tung et al. ..................... 341/28 |
| 2011/0171617 A1 * | 7/2011 | Yeh et al. ...................... 434/157 |

OTHER PUBLICATIONS

Innovation Management Group, Inc., Touch Screen Keyboard Combination-Microsoft XP on-screen keyboard, downloaded from http://www.my-t-touch.com on May 29, 2009.

Security Solution Inc., 5.8-Inch Touch Screen Keyboard with Power Consumption of 6W and 12V DC Voltage, Model No. VKB-400/B, downloaded from http://szvideotrec.manufacturer.globalsources.com on May 29, 2009.

* cited by examiner

INPUT DEVICE FOR PICTOGRAPHIC LANGUAGES

BACKGROUND

1. Field

The invention relates to an electronic input device, such as a touchscreen keyboard, for inputting characters of pictographic languages, such as written Chinese.

2. Description of the Related Art

Various electronic devices have been developed to process information. Among other such electronic devices, computers and electronic devices having computing capabilities often interface with a user via an input device. Where a language used by the user has an alphabet-based writing system (for example, English), the language can be inputted into the electronic device, using a limited number of letters. Thus, an input device for the electronic device only needs to have a limited number of keys corresponding to the letters. The QWERTY keyboard is one example of an input device for a language having alphabet-based writing system.

Certain languages, however, have a pictographic writing system. A pictographic writing system typically includes a large number of characters, each of which is a word and can have a specific phonetic sound. In addition, two or more characters may be combined to comprise a unique third word. For example, the written Chinese language is well-known to be a pictographic writing system. It is estimated that about 7,000 or more characters are used by a well-educated Chinese writer and reader.

The number and complexity of the characters in a pictographic language present significant challenges for input devices used to input these characters. There is no "alphabet" as each character denotes a unique word or words. Some input devices or systems for pictographic languages use a standard QWERTY keyboard with symbols or characters assigned to the individual keys of the QWERTY keyboard. For written Chinese, input systems typically involve inputting characters based on pronunciation of the word (for example, "sounding out the word"), character strokes, character structure/radicals/roots, or combinations thereof. Examples of such input systems include "Pinyin," "Wubi," "Bopomofo," "Dayi," and "Cangjie."

Such conventional input devices or systems for a pictographic language can be effective with users having familiarity with the language, for example, native speakers. However, non-speakers and students learning the language typically face difficulties in using such devices or systems. Thus, there is an on-going need to provide an input device or system that can be effectively used by both non-speakers and those learning a pictographic language as well as native speakers.

SUMMARY

According to one embodiment, a touchscreen keyboard for a pictographic language includes: a touchscreen display; and a display controller programmed to display a first arrangement of pictographic characters on the touchscreen display. The first arrangement includes a plurality of characters of the pictographic language, wherein the first arrangement includes a plurality of discrete regions arranged in a matrix form. Each of the regions displays a respective one of groups of characters selected from the plurality of characters. Each of the regions includes 15 characters arranged in 3 columns and 5 rows. The display controller is further programmed to display characters in a matrix form in a respective one of the regions. Characters in at least one of the regions have the same first phonetic sound as one another. The regions are arranged at positions corresponding to positions of keys of a QWERTY keyboard, such that the first phonetic sounds of the characters of the regions substantially correspond to the phonetic sounds of letters on the keys of the QWERTY keyboard.

According to another embodiment, an input system for a pictographic language includes: a touchscreen display; and a display controller programmed to display a first arrangement of pictographic characters on the touchscreen display. The first arrangement includes a plurality of characters of the pictographic language, wherein the first arrangement includes a plurality of discrete regions. Each of the regions displays a respective one of groups of characters selected from the plurality of characters. The display controller is programmed to receive selection of one of the regions by receiving a touch on the selected region of the touchscreen display, and to receive selection of a character in the selected region after receiving the selection of the region.

According to yet another embodiment, a computer readable medium has stored thereon instructions that, when executed, direct a touchscreen display device to: display a first arrangement including a plurality of characters of a pictographic language, wherein the first arrangement includes a plurality of regions, each of the regions displaying a respective one of groups of characters selected from the plurality of characters. The instructions, when executed, further direct a touchscreen display device to receive selection of one of the regions; and receive selection of one of the characters in the selected region after receiving the selection of the region.

According to yet another embodiment, an input system for a pictographic language includes: a monitor; a standard Roman character keyboard including character keys and numeric keys; and a display controller programmed to display a first arrangement including a plurality of characters of a pictographic language on the monitor. The arrangement includes a plurality of regions, each of the regions displaying a respective one of groups of characters selected from the plurality of characters. The system is further programmed to receive selection of one of the regions via one of the character keys of the keyboard, and to receive selection of one of the characters in the selected region via one of the numeric keys of the keyboard.

According to yet another embodiment, a system for inputting a pictographic language includes: a server in data communication with an end user device including a monitor; and a software program stored in the server, the software program being downloadable to the end user device. The software program includes instructions that, when executed, direct the end user device to display a first arrangement including a plurality of characters of a pictographic language on the monitor, wherein the first arrangement includes a plurality of regions, each of the regions displaying a respective one of groups of characters selected from the plurality of characters. The instructions, when executed, further direct the end user device to receive selection of one of the regions; and receive selection of one of the characters in the selected region after receiving the selection of the region.

Other embodiments of the present invention will be readily apparent to those skilled in the art from the following detailed description of some embodiments and with reference to the attached figures. The invention is not limited to any of the particular embodiments disclosed herein.

BRIEF DESCRIPTION OF THE DRAWINGS

The invention will be better understood from the Detailed Description of Some Embodiments and from the appended drawings, which are meant to illustrate and not to limit the invention. Like numerals refers to like parts throughout.

FIG. 7B illustrates the operation of the touchscreen display of the input device of FIG. 1, in which a next character region is activated upon touching a character on a magnifying window according to another embodiment of the invention.

FIGS. 8A and 8B illustrate the operation of the touchscreen display of the input device of FIG. 1, in which a magnifying window with shortcut buttons to custom pages is activated upon touching one of grids of characters according to one embodiment of the invention.

DETAILED DESCRIPTION OF SOME EMBODIMENTS

Figure 1:
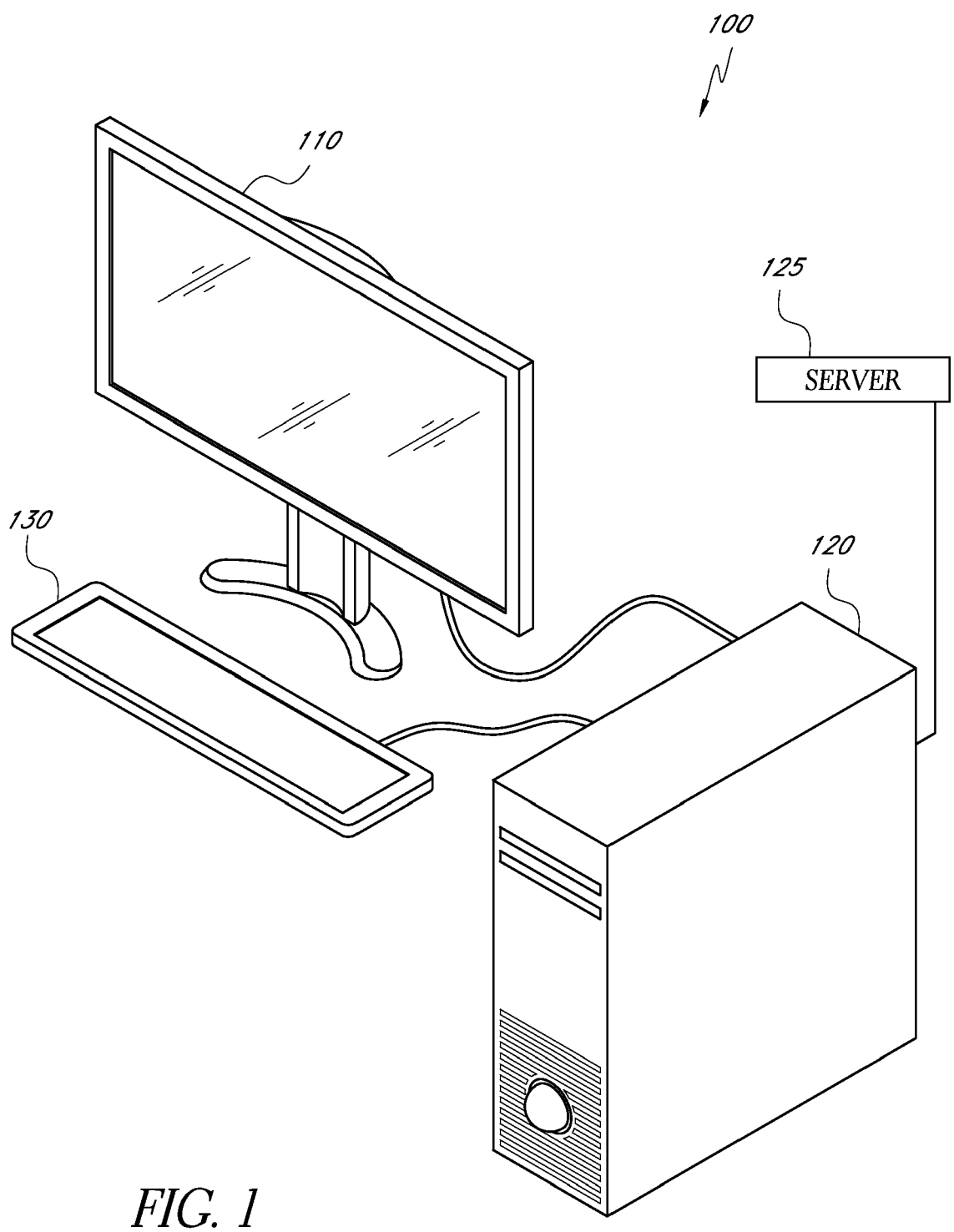
FIG. 1 is a schematic diagram of a computer system including a touchscreen input device according to some embodiments of the invention.

In some embodiments, an input device and related systems for inputting a pictographic language into an electronic system is provided. The input device includes a display that displays an array of commonly used characters. The characters are grouped in particular regions, with the grouping made, for example, based upon pronunciation of the characters. The regions in turn are organized according to user preferences. In some preferred embodiments, the regions have an arrangement that matches the orientation of letters on a QWERTY keyboard, although not all 26 letters on the QWERTY keyboard have corresponding Chinese sounds. For example, the characters are grouped so that all those in a group have a similar first phonetic sound and the group is in a region corresponding to the location of a letter for that sound.

In some embodiments, the input device can include a touchscreen display. The touchscreen display is programmed to display a first arrangement including a first set of characters of the pictographic language. The first arrangement includes a plurality of regions, each of which contains a plurality of complete characters displayed therein. A user can select a character by first selecting the region including that character, to highlight the region, and then selecting the characters in the highlighted region. This configuration provides an input device that can be effectively used by non-speakers and students of the pictographic language as well as native speakers.

It will be appreciated that a well-educated Chinese speaker may recognize 7,000 or more Chinese characters. The government of the People's Republic of China defines literacy as knowledge of at least 2,000 Chinese characters. An understanding of about 800-1,000 characters, however, is believed to allow a person to read a Chinese newspaper. Advantageously, the first arrangement can contain about 800-840 of the most commonly used Chinese characters. These characters allow the user to directly input characters to, for example, perform basic written communications, such as e-mail. Additional characters can be provided in additional arrangements by refreshing the arrangement displayed on the touchscreen display.

In practice, many of the existing methods for inputting pictographic characters essentially require a user to learn a system for coding the pictographic characters using the keys of a keyboard. A computer then decodes the "coded" keystrokes to display the desired character. Thus, the existing methods require a language student to first learn the characters of the language and then learn the "coding" system used by that language in order to input characters electronically. Advantageously, preferred embodiments of the invention provide efficient systems and methods that remove the intermediate coding and decoding step, thereby allowing a user to more quickly communicate via the written pictographic language. This reduces barriers to written communication for students of the pictographic language.

Reference will now be made to the Figures, in which like numerals refer to like parts throughout.

Referring to FIG. 1, a computer system 100 for inputting a pictographic language according to some embodiments will be described below. The pictographic language can be written Chinese. In other embodiments, the pictographic language can be any other pictographic language including, without limitation, Japanese Kanji and Korean Hanja. The illustrated computer system 100 includes a display device 110, a computer 120, and an input device 130. The computer 120 can be connected to a server 125 in some embodiments.

The display device 110 serves to provide a visual interface with a user. The display device 110 can display graphics, images, and/or characters, depending on the software program running on the computer 120. The display device 110 can be any suitable display device, for example, an LCD display or a CRT display.

The computer 120 serves to store software programs and provide operations according to commands provided by the software programs. The computer 120 can be any suitable general purpose computer, or a computer specifically adapted for the system 100. The computer 120 can include a CPU, one or more volatile and non-volatile memories, a hard disk drive, and any other components required for the operation of a computer, as known in the art. The computer 120 can operate on any suitable operating system, for example, any version of Microsoft Windows®, Linux®, or Mac OS®. In some embodiments, the computer 120 can be a central server connected to multiple display devices 110 and input devices 130.

The input device 130 serves as a keyboard and provides an interface for a user to input commands, characters, and/or numbers for the operation of the computer 120. In the illustrated embodiment, the input device 130 is a touchscreen display device that can display graphics, images, and/or characters while receiving inputs by touches of a user. Details of the input device 130 are described further herein.

In the illustrated embodiment, the display device 110, the computer 120, and the input device 130 are separated from one another. In other embodiments, however, two or more of the display device 110, the computer 120, and the input device 130 can be integrated with one another. In other embodiments, one or more of the display device 110, the computer 120, and the input device 130 can be implemented in a single housing, for example, the form of a laptop computer or a display device having a touchscreen (thereby combining devices 110 and 130).

In embodiments, the input device 130 can be connected via, for example, a USB port, for example, to a laptop computer, which already has a conventional keyboard, such as a QWERTY keyboard. In the context of this document, a laptop computer refers to any portable computer, including, but not limited to, a conventional laptop computer, a netbook, and a hand-held computer. In some embodiments, the input device 130 can be connected to any electronic device with computing capability, for example, a mobile phone, a smart phone, a digital video/audio player (for example, iPod®), a telephone with a screen, a television, a digital book device, a personal digital assistant (PDA), a facsimile machine with a screen, a scanner with a screen, a multi functional peripheral device with a screen, and the like. These devices can include a memory and a processor functioning as the computer 120, along with a display functioning as the display device 110.

Figure 2:
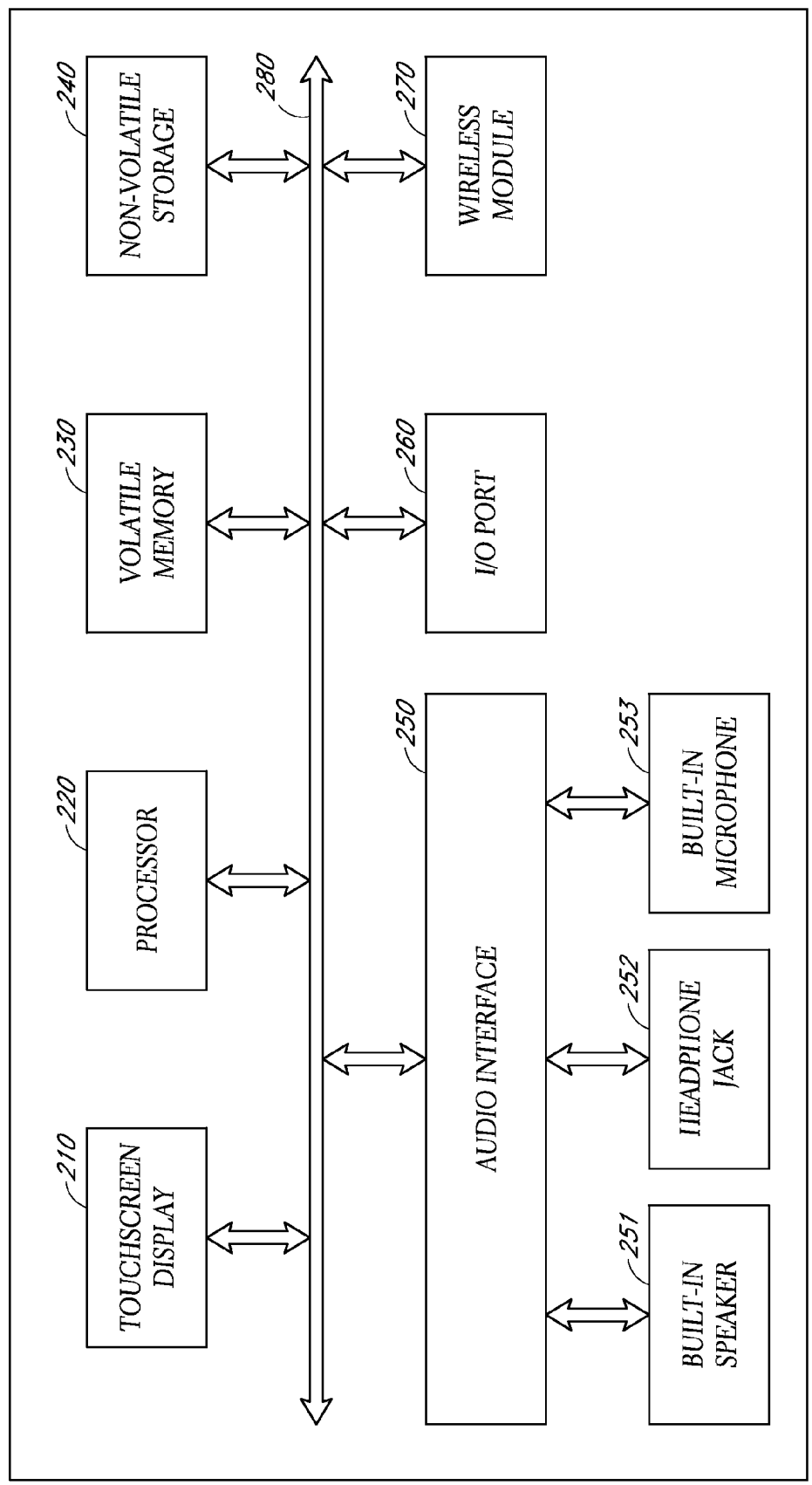
FIG. 2 is a block diagram schematically illustrating components of the touchscreen input device of FIG. 1.

Referring to FIG. 2, one embodiment of the input device 130 of FIG. 1 is schematically illustrated. The illustrated input device 130 includes a touchscreen display 210, a processor 220, a volatile memory 230, a non-volatile storage 240, an audio interface 250, an input/output (I/O) port 260, and a wireless module 270 that are in data communication with one another via a data bus 280. The processor 220 and non-volatile storage 240 constitute a controller for controlling the touchscreen display 210. The input device 130 can include any other components that are needed for the operation of the input device 130. In other embodiments, one or more (for example, the wireless module 270) of the above-mentioned components can be omitted. In some other embodiments, various components, for example, the controller and memory can be located physically separated from the input device 130, or can be omitted altogether.

The touchscreen display 210 serves as both an input device and a display device. In some embodiments, the touchscreen display 210 can be a liquid crystal display (LCD). The touchscreen display 210 can have multi-touch capability and a back light. It will be appreciated that other display technologies known in the art and allowing touch-sensitive operation may also be used.

The processor 220 serves to perform and control operations of the input device 130 according to a software program and/or user commands. The processor 220 can be a processor or microprocessor of any suitable type.

The volatile memory 230 can be a random access memory (RAM) of any suitable type and capacity. The non-volatile storage 240 can be a read only memory (ROM) of any suitable type and capacity. The non-volatile storage 240 can also include one or more of a hard disk and a flash memory. In some embodiments, the non-volatile storage 240 can store various commands and software programs for operating the input device 130. Programming stored in the input device 130 allows the device 130 to achieve the display screens and functionality described herein. It will be appreciated that programming to achieve the displays and functionality herein described can be provided to a user as a permanent part of the input device 130, or can be loaded into a general purpose touchscreen device from a server or connected computer, which loading can allow the programming and resulting functionality of the device 130 to be loaded onto the device 130.

The audio interface 250 serves to provide an interface for audio data communication with an external device and built-in audio devices. The audio interface 250 can be connected to one or more of a built-in speaker 251, a headphone jack 252, and a built-in microphone 253. The audio interface 250 can also provide one or more ports that can be connected to an external speaker and/or microphone.

The I/O port 260 serves as a port for data communication with an external device, such as the display device 110 and/or the computer 120 of FIG. 1, or any other peripheral devices, for example, a mouse and a conventional keyboard. In one embodiment, the I/O port 260 can include one or more universal serial bus (USB) ports and/or one or more parallel or serial ports. In some embodiments, the I/O port 260 can be used for downloading additional fonts, characters, configurations, and/or updates for the input device 130 from a data source, including, but not limited to, the computer 120. Such a data source can be a server or another computer that can be connected to the input device 130 over the Internet or LAN, or via a local, standalone computer 120 of the system 100.

In some embodiments, in addition to, or instead of a wired connection, the wireless module 270 serves to provide a wireless connection with an external device, such as the display device 110 and/or the computer 120 of FIG. 1. The wireless module 270 can also provide a wireless connection with any other electronic device having wireless capability. The wireless module 270 can be a wireless chip and transmitter and antenna that can operate in any suitable wireless network, for example, Wireless LAN (WLAN). The wireless chip can operate in compliance with any suitable wireless protocol, for example, IEEE 802.11 (for example, Wi-Fi®) or Bluetooth®.

Figure 3A:
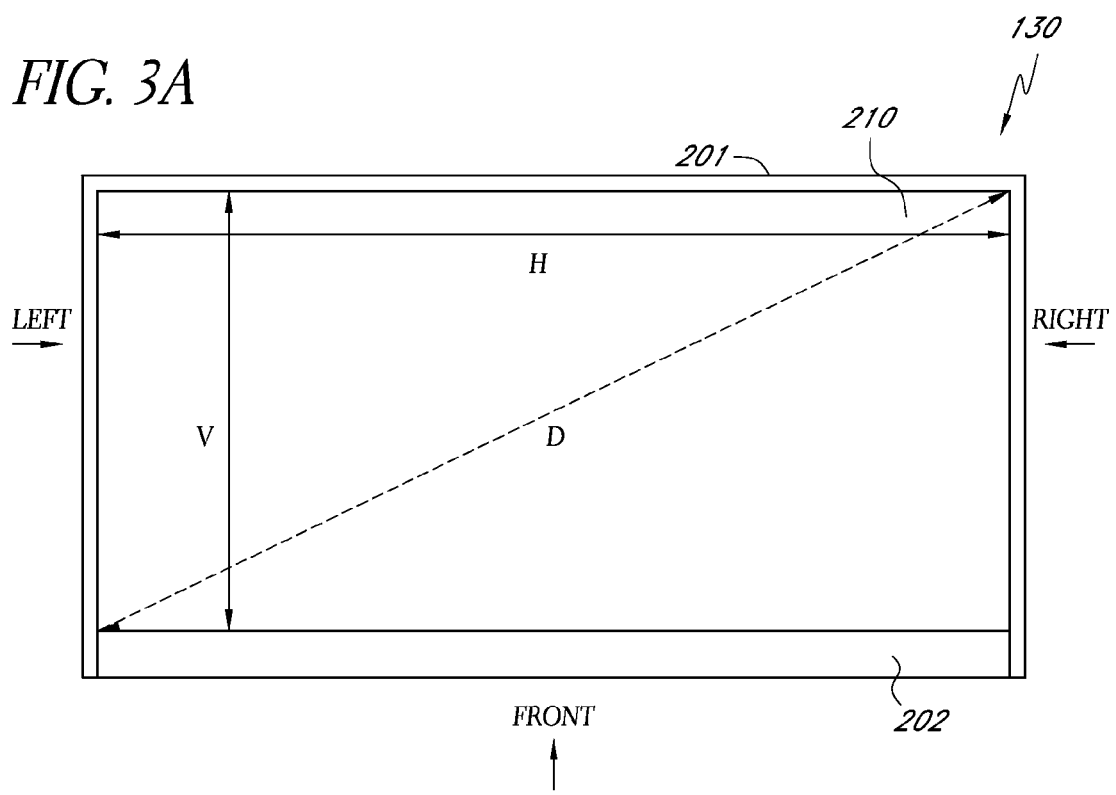
FIGS. 3A to 3D are a top plan view, a front view, a left side view, and a right side view, respectively, of the touchscreen input device of FIG. 1.

Referring to FIGS. 3A-3D, an external appearance of the input device 130 according to one embodiment is illustrated. A top plan view of the input device 130 is shown in FIG. 3A. When viewed from above, the input device 130 includes a housing 201, a pad 202 which can be omitted in some embodiments, and a touchscreen display 210. The housing 201 may have a rectangular shape or other arbitrary shape, and can be formed of any suitable material, such as a plastic or metallic material. The pad 202 is positioned along the bottom side of the housing 201 when viewed from above. The pad 202 is configured to provide ergonomic comfort to a user's wrist or hand, and can be formed of memory foam or rubber or other comparable material.

The input device 130 can be formed of a suitable size for desired applications. For example, in some embodiments, when viewed from above, the touchscreen display 210 can have a horizontal length H ranging from about 11.5 inches to about 12.5 inches, and a vertical length V ranging from about 5.5 inches and to about 6.5 inches in some embodiments. For example, when viewed from above, the touchscreen display 210 can have a vertical length V of about 6 inches and a horizontal length H of about 12.5 inches with a diagonal length D of about 13.5 inches, such sizes can have advantages for integration with existing keyboard trays and holders.

Figure 3B:
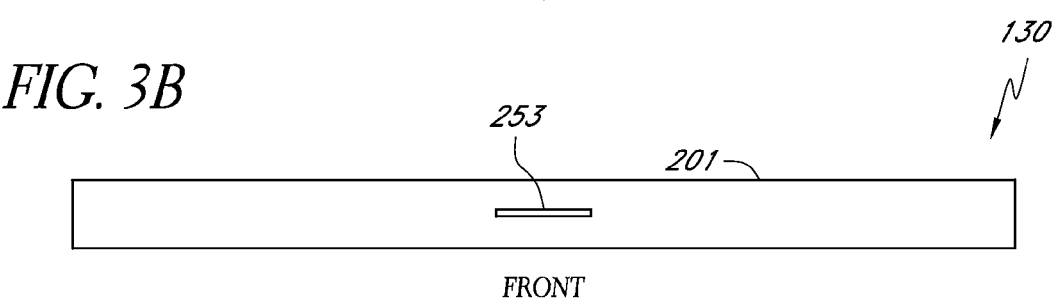
Figure 3C:
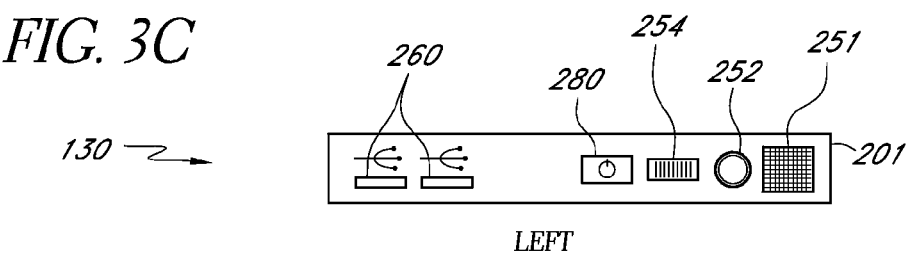
Figure 3D:
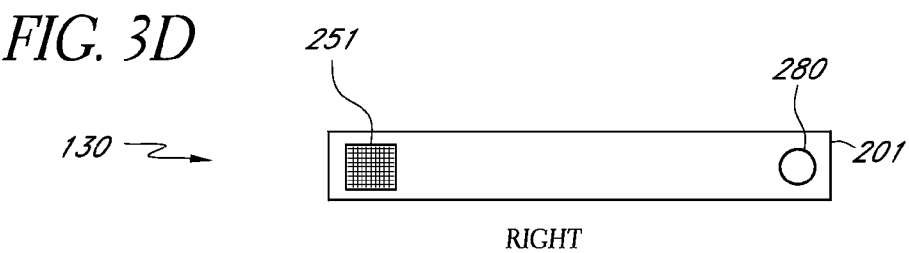

On the front surface of the housing 201 of the input device 130, a built-in microphone 253 may be positioned at the center of the front surface, as shown in FIG. 3B. On the left side surface of the housing 201 of the input device 130 are USB ports 260, a power switch 280, a volume controller 254, a headphone jack 252, and a built-in speaker 251, as shown in FIG. 3C. On the right side surface of the housing 201 of the input device 130 are another built-in speaker 251 and a stylus housing hole 280, as shown in FIG. 3D. The stylus housing hole 280 is configured to provide storage for a stylus, details of which will be described later. A skilled artisan will appreciate that the positions of the above-mentioned components can vary widely depending on the design of the input device 130. Moreover, one or more of the components can be omitted or duplicated as desired.

In some embodiments, the input device 130 can have an embedded voice recognition software program to help the selection and teaching of characters. The built-in microphone 253 (FIGS. 2 and 3B) can be used by a user to speak a word or character or to provide the first phonetic sound of a character or word to the input device 130. The input device 130, upon recognizing the character or word or sound, can highlight the character or word or appropriate region on the touchscreen display 210. In another embodiment, the recognized character can blink. In yet another embodiment, when a word is recognized, the input device 130 can display characters constituting the word simultaneously or sequentially. In certain embodiments, when a particular character displayed on a monitor (for example, the display 110 of FIG. 1) is selected by using, for example, a mouse, the corresponding character on the touchscreen display 210 can light up or blink.

Figure 4A:
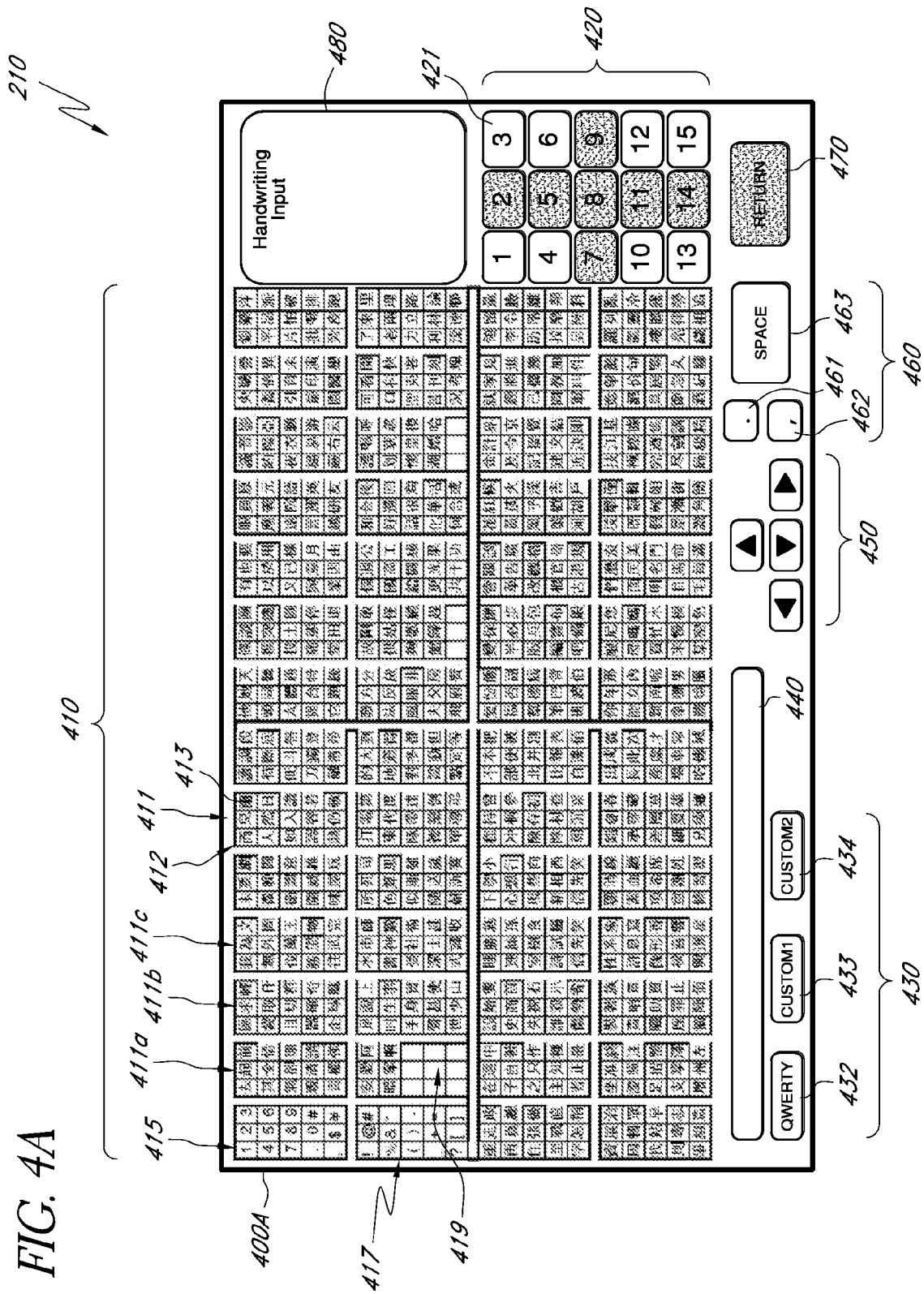
FIG. 4A illustrates the touchscreen display of the input device of FIG. 1, which displays a homepage according to one embodiment of the invention.

In other embodiments, the input device 130 can provide the pronunciation of a selected character or word upon the user's request or by default. The built-in speaker 251 or the headphone jack 252 can be used to provide such pronunciation Referring to FIG. 4A, one embodiment of a homepage of the input device 130 is illustrated. The touchscreen display 210 of the input device 130 can display a homepage or initial page 400A, as shown in FIG. 4A. Although not illustrated in FIG. 4A, the touchscreen display 210 can also display additional default pages, customized pages, and/or a replica QWERTY keyboard, as described further herein.

In the illustrated embodiment, the homepage 400A of the touchscreen display 210 displays an array 410 of key regions 411, 415, 417, 419, a selection pad 420, page selection buttons 430, a next character selection region 440, directional buttons 450, punctuation keys 460, a return key 470, and a stylus pad (or handwriting pad) 480. Although not shown, the homepage 400A can also be programmed to display other menus and/or functional keys, for example, "Tab," "Ctrl," "Alt," "Shift," "Delete," "Caps Lock," "Backspace," and the like.

The array 410 of key regions includes a plurality of key regions that are generally arranged in a matrix form. In the illustrated embodiment, the array 410 includes 14 columns and 4 rows of key regions. In other embodiments, the numbers of rows and columns can vary from that illustrated, depending on the design of the homepage 400A.

The array 410 includes a plurality of character key regions 411, a numeric and symbol key region 415, a special character key region 417, and a blank key region 419. The numeric and symbol key region 415, the special character key region 417, and the blank key region 419 are positioned at the leftmost side in the array 410. A skilled artisan will, however, appreciate that each of the numeric and symbol key region 415, the special character key region 417, and the blank key region 419 can be positioned at other positions or omitted as desired, depending on the desired design of the homepage 400A.

Each of the key regions 411, 415, 417, 419 can include a grid 412 including cells 413 arranged in a matrix form. In the illustrated embodiment, each of the key regions 411, 415, 417, 419 is in the shape of a box and includes 3 columns and 5 rows of cells. A skilled artisan will, however, appreciate that the number and arrangement of the cells in each of the key regions 411 can vary from that illustrated, depending on the design of the homepage 400A. In another embodiment, at least one of the key regions 411 can show an array of characters, symbols, and/or numbers in a matrix form without including a grid. It will be appreciated that the illustrated matrix, with its 3×5 grid, has various advantages in operation, as discussed herein.

Each of the character key regions 411 can contain Chinese characters in the cells thereof. Each of the cells of the character key regions 411 can contain a single Chinese character. Details of the character key regions 411 are described further herein.

The numeric and symbol key region 415 can contain numbers from 0 to 9, and various symbols (for example, "$" and "#"). The special character key region 417 can contain various special characters and punctuation marks, such as "!", "@," "%," and the like.

The blank key region 419 can contain characters selected by a user. In certain embodiments, a word of two or more characters can be placed in a cell of the blank key region 419. For example, a user's commonly used words (for example, names, places, and technical terms) can be placed in the cells of the blank key region 419. The placement may be made by the user, who can select characters, or the characters can be selected automatically, for example, using a program that keeps track of, selects, and displays words commonly used by the user.

In the illustrated embodiment in which the homepage 400A is designed for inputting Chinese characters, the character key regions 411 on the homepage 400A display Chinese characters. The Chinese characters in the character key regions 411 can be displayed in traditional form. In some embodiments, the Chinese characters can be optionally displayed in simplified form. For example, a character representing a horse, "馬" (traditional form), can be optionally displayed in its simplified form, "马." In some embodiments, the user can select between simplified or traditional characters as desired.

The Chinese characters shown on the homepage 400A can be selected from commonly used characters, for example, about 800-840 of the most commonly used Chinese characters. In the context of this document, such commonly used characters can be referred to as "homepage characters."

In some embodiments, each of the character key regions 411 can include Chinese characters having the same or similar phonetic sounds, preferably the same or similar first phonetic sound. As used herein, it will be appreciated that the first phonetic sound refers to the phonetic sound in a desired version or dialect of spoken Chinese, for example, Mandarin or Cantonese. In some preferred embodiments, the first phonetic sound is the first phonetic sound for the word in Mandarin. In the illustrated embodiment, substantially all of the characters in each of the character key regions 411 have the same first phonetic sound. In such an embodiment, the character key regions 411 can be arranged such that the phonetic sounds of the characters in the regions 411 correspond to the location of keys for similar sounding letters in a conventional Roman (or English) alphabet keyboard layout, for example, the QWERTY keyboard layout. For example, a first character key region 411*a* at a first row and a first column can have characters having a first phonetic sound corresponding to the phonetic sound associated with the letter "Q", that is, the sound of "Q". A second character key region 411*b* at the first row and a second column can have characters having a first phonetic sound of "W." A third character key region 411*c* at the first row and a third column can have characters having the first phonetic sound of "E." In other embodiments, the conventional Roman character keyboard layout can be a Dvorak keyboard layout, a QWERTZ keyboard layout, or an AZERTY keyboard layout with the location of character key regions 411 corresponding to the location of letters, of corresponding phonetic sound, in these keyboard layouts. In the illustrated embodiments, within each unique key region 411, the Chinese characters are arranged based on their frequency of use within both written and spoken Mandarin with the most frequently used characters in the first row descending to the least frequently used characters in the fifth row.

In certain embodiments, for example, due to the lack of words with a particular phonetic sound, the array 410 may not have a character key region for a certain phonetic sound although the QWERTY layout has a key for the letter with that phonetic sound. For example, the array 410 may not have a character key region for characters having a phonetic sound of "V," which is present in the QWERTY layout. However, the order and general relative spatial arrangement of the character key regions 411 generally correspond to the order and arrangement of keys of the QWERTY or other keyboard layout onto which the regions 411 may be mapped.

Referring again to FIG. 4A, the selection pad 420 of the homepage 400A includes fifteen numeric selection keys 421 arranged in a matrix form. The numeric selection keys include numbers from 1 to 15 in 5 rows and 3 columns. The arrangement of the numeric selection keys corresponds to the arrangement of characters in each of the character key regions 411. In the illustrated embodiment, each of the character key regions 411 has a 3×5 arrangement, and thus the selection pad 420 also has the 3×5 arrangement. In other embodiments where each of the character key regions on the touchscreen display has a different arrangement (for example, 4×5), the selection pad also has that different arrangement (for example, 4×5). The operation of the selection pad 420 is further described in connection with FIG. 6.

The page selection buttons 430 allow a user to select one of the additional pages which may be programmed into and are displayable by the touchscreen display 210 (FIGS. 2 and 3). The additional pages can include one or more additional default character pages, a replica English (for example, QWERTY) keyboard page, and/or one or more custom pages. In the illustrated embodiment, the page selection buttons 430 of the homepage 400A includes a QWERTY page button 431, a first custom page button 432, and a second custom page button 433, which allow the user to select a replica QWERTY page, a first custom page, and a second custom page, respectively. Some additional details of the additional pages are described in connection with FIG. 5.

The next character region 440 serves to allow a user to select one of the characters that may commonly follow an already selected character. Details of the operation using the next character region 440 are further described in connection with FIG. 7A.

The directional buttons 450 serve to allow the user to move a cursor to a desired location on the screen of the display device (for example, the display device 110 of FIG. 1). The punctuation keys 460 allow the user to use desired punctuation marks, such as "comma (,)," "period (.)," and "space." The return key 470 allows the user to execute a command, or move to a next line on the display device's screen.

The stylus pad 480 serves to allow a user to handwrite a character using a stylus, which may be an electronic pen, or the user's finger, or other object. The stylus pad 480 can be used for writing, for example, uncommon words, pronouns, and names. The stylus pad 480 can also be used when the user knows a character, but is unable to locate the character on the character key regions 411. It will be appreciated that any suitable stylus technology can be adapted for the stylus pad 480.

In certain embodiments, the touchscreen display 210 (FIGS. 2 and 3A) can have small bumps (not shown) protruding from the top surface of the touchscreen display 210. The small bumps can be positioned to provide locations of certain character key regions by tactile feel. For example, the touchscreen display 210 can have a bump at a position where a character key region for characters having a phonetic sound of "J" is located. The bumps allow the user to easily and consistently orient their hands over the touchscreen display 210.

Figure 4B:
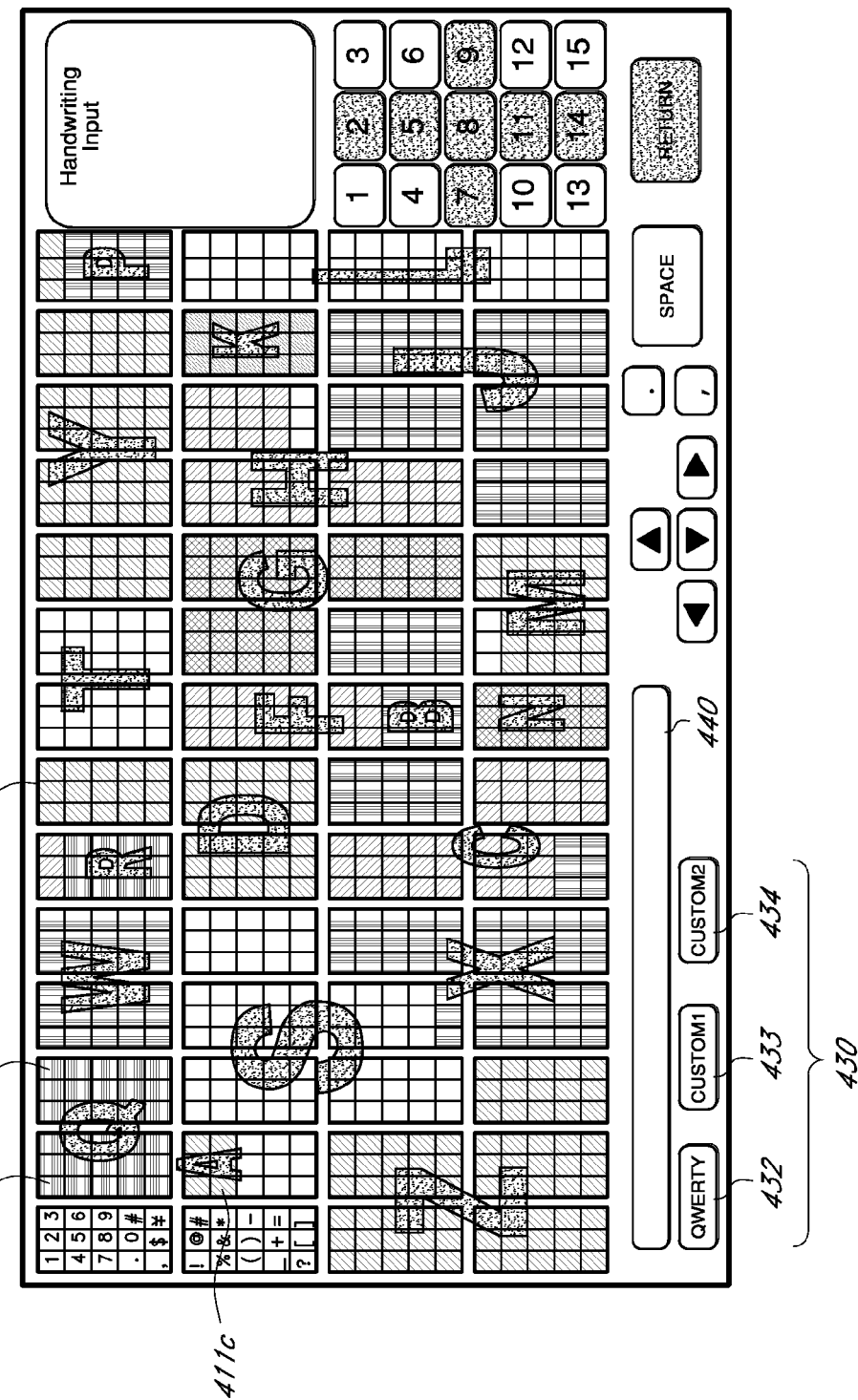
FIG. 4B illustrates the touchscreen display of the input device of FIG. 1, which displays a homepage having background English alphabet letters with color shading according to another embodiment of the invention.

Referring now to FIG. 4B, a homepage 400B of the touchscreen display 210 according to another embodiment is illustrated. In the illustrated embodiment, characters are omitted for the sake of simplicity of explanation. The homepage 400B can have a background color layer, as shown in FIG. 4B by different shading or hatching. The background color layer can include regions of different colors representing different phonetic sounds. The colors are selected and adjusted so that the colors do not disrupt the user's ability to see characters in the character key regions 411. For example, the colored regions are "transparent" to the characters. In another embodiment, the background color layer can have different grayscales, in combination with or instead of, different colors.

Each of the colors used for the background color layer can be assigned to one or more of the character key regions 411 and/or a portion of one of the character key regions 411. For example, a first character key region 411*a* at a first row and a first column, and a second character key region 411*b* at the first row and a second column can have characters having the same first phonetic sound of "Q." In such an instance, the first and second character key regions 411*a*, 411*b* can have the same background shading or color, for example, yellow.

In some embodiments, at least one of the character key regions 411 can contain two or more groups of characters having different phonetic sounds from one group to another. For example, among 15 characters in a character key region 411, characters on the first and second rows in the region 411 can have "J" sound, whereas characters on the third to fifth rows can have "M" sound. Such a character key region can have two different colors for the groups of characters according to their phonetic sounds. For example, a third character key region 411*c* at a second row and the first column can have two different colors. The first two rows in the region 411*c* can be in, for example, pink, and the other rows in the region 411*c* can be in, for example, green.

In certain embodiments, in addition to the background color layer, phonetic characters (for example, English alphabet letters) corresponding to the phonetic sounds represented by the background colors are also provided, as shown in FIG. 4B. In one embodiment, the English letters can lie behind Chinese characters in the character key regions 411. The English letters can also extend over two or more of the character key regions 411.

Figure 4C:
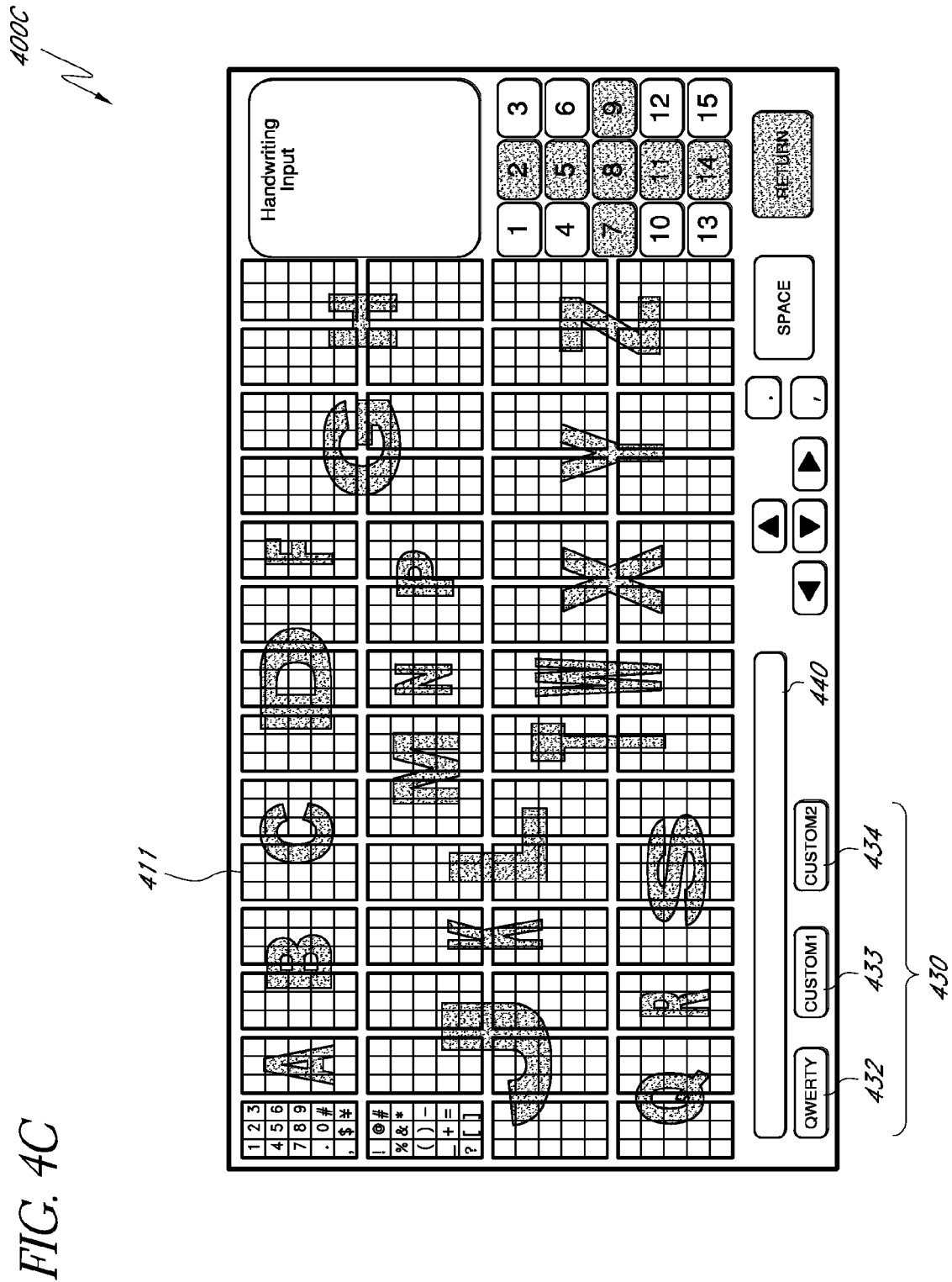
FIG. 4C illustrates the touchscreen display of the input device of FIG. 1, which displays a homepage having background English alphabet letters according to yet another embodiment of the invention.

Referring to FIG. 4C, a homepage 400C of the touchscreen display 210 according to yet another embodiment will be described below. In the illustrated embodiment, each of the character key regions 411 can include Chinese characters having the same or similar first phonetic sound. The character key regions 411 can be arranged such that the phonetic sounds of the characters in the regions 411 are in alphabetical order, as determined by the English alphabet. Other details of the homepage 400C can be described earlier with respect to the homepage 400A of FIG. 4A. In addition, the homepage 400C can also have a background color or shading layer and/or English letters as described herein.

Figure 5:
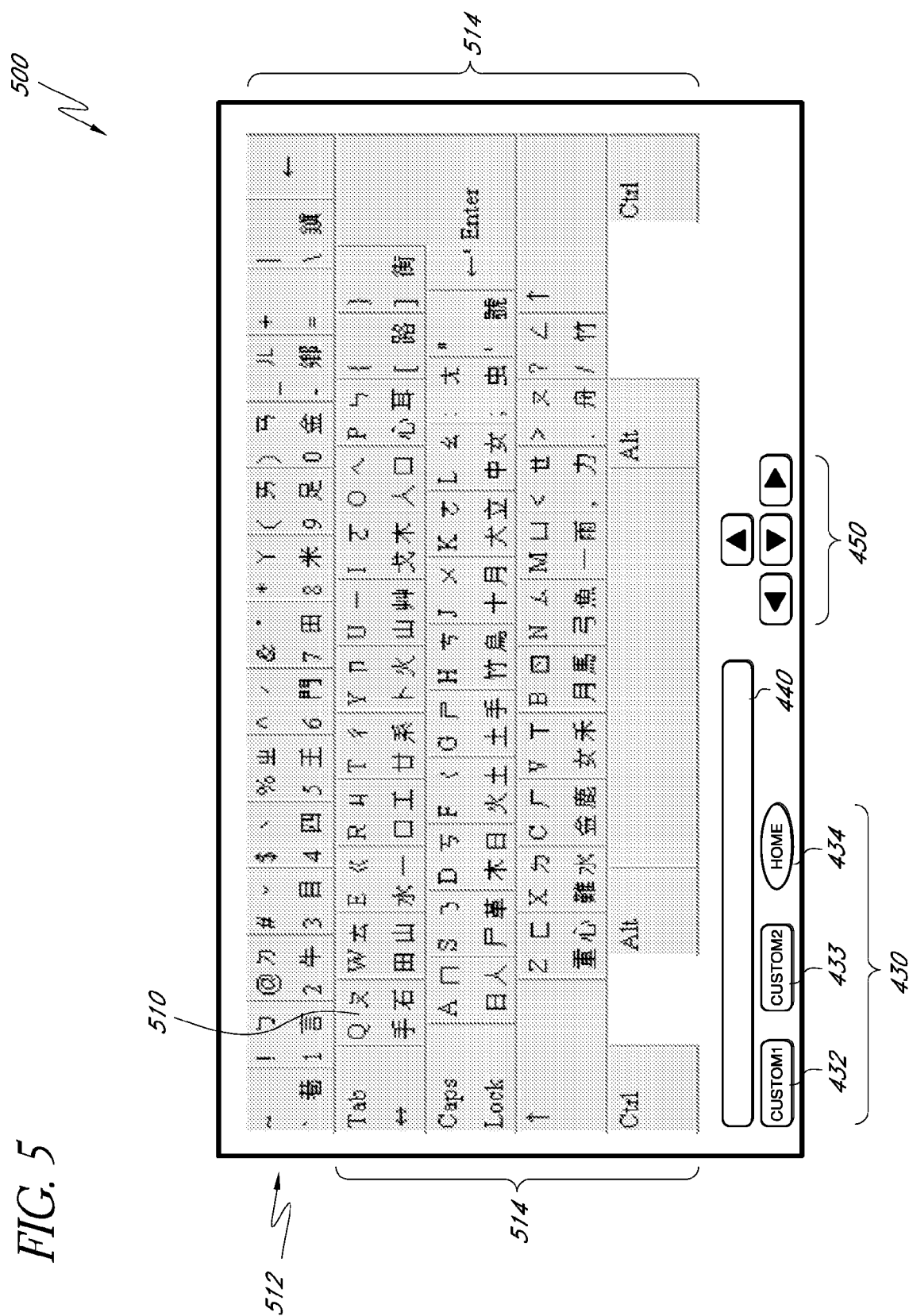
FIG. 5 illustrates the touchscreen display of the input device of FIG. 1, which displays an additional page having a standard QWERTY layout with Chinese radicals and characters according to yet another embodiment of the invention.

In one embodiment, the touchscreen display 210 of FIGS. 2 and 3A can also display a replica QWERTY keyboard 500, as shown in FIG. 5, when the user touches the QWERTY page button 431 on the homepage 400A of FIG. 4A. The replica QWERTY keyboard 500 can include English alphabet letter keys 510 arranged in the QWERTY layout, number and symbol keys 512, and other functional keys 514, such as "Tab," "Ctrl," "Alt," "Shift," "Delete," "Caps Lock," "Backspace," and "Enter." The replica QWERTY keyboard 500 can also show Chinese roots or radicals that are used for other conventional Chinese input systems, such as Wubi, Cangjie, or Bopomofo. This configuration allows a user to use such conventional Chinese input systems with the input device.

The replica QWERTY keyboard 500 can also include page selection buttons 430, a next character selection region 440, and directional buttons 450. The page selection buttons 430 allow a user to access one of other pages, including the homepage 400A of FIG. 4A, the first custom page, and the second custom page. Details of the next character selection region 440 are described further below. Details of the directional buttons 450 can be as described above with respect to the directional buttons 450 of the homepage 400A.

In some embodiments, the touchscreen display 210 of the input device 130 (FIG. 3A) can also display two or more custom pages. In the illustrated embodiments, the touchscreen display 210 can display first and second custom pages. Each of the first and second custom pages can contain additional Chinese characters that are not shown on the homepage 400A of FIG. 4A. The configurations of the first and second custom pages can be the same as described above with respect to the homepage 400A of FIG. 4A except that the custom pages can display characters selected by the user.

In some embodiments, the touchscreen display 210 can also display one or more additional default pages for characters that are less commonly used than the homepage characters. For example, a second page can display less commonly used characters and a third page can display characters that are even more less common. In other embodiments, the touchscreen display 210 can also display one or more additional pages for characters for specific usages or industries, such as a page for characters used in, for example, financial, medical, legal, scientific, or engineering fields.

In preferred embodiments, the layout and/or arrangement of the homepage is standardized and is not changeable by the user, although the layout and/or arrangement of each of the additional pages may be customized by the user. For example, each of the additional pages can be customized to have a different number and arrangement of characters. In other embodiments, one or more of the additional pages may also be standardized and not changeable by the user. Advantageously, a standardized homepage (and standardized additional pages in some embodiments) allows users to quickly transition from using one input device 130 to another input device 130, since the positions and arrangement of characters on the keyboard will remain the same between input devices 130.

However, as the characters and the arrangement of the homepage is preferably determined based on programming, it will be appreciated that the homepage may be easily modified in some applications. For example, different homepages may be generated for different industries or businesses based, e.g., on the commonly used words in those contexts. In other embodiments, the homepage may optionally be customized by the user to, e.g., change the position and/or identity of characters. Additionally, the input device 130 may provide an option to display a customized homepage for the regular user of that input device and a standard homepage, e.g., for a user that does not regularly use that particular input device.

In addition, the pages can also be adjusted to be left- or right-hand compatible. For example, the selection pad 420 and the stylus pad 480 can be moved to the left side for a left-handed user. Further, in some embodiments, the character key regions 411 can be ergonomically arranged to prevent users from having health issues. For example, the regions 411 can be angled towards a user's left and right hands, respectively. In some embodiments, the font size and style of characters displayed by the touchscreen display 210 can also be changed. Various fonts can be downloaded from a data source, such as a server, accessed, for example, on an internet website.

In some embodiments, the homepage and the additional pages can have different background colors from one another, or be shaded differently so that a user can readily identify which page the user is currently using. For example, the homepage can have a shade of red, while the first custom page has a shade of yellow or other color and/or graphical indication to show that the user is on a different page.

Figure 6:
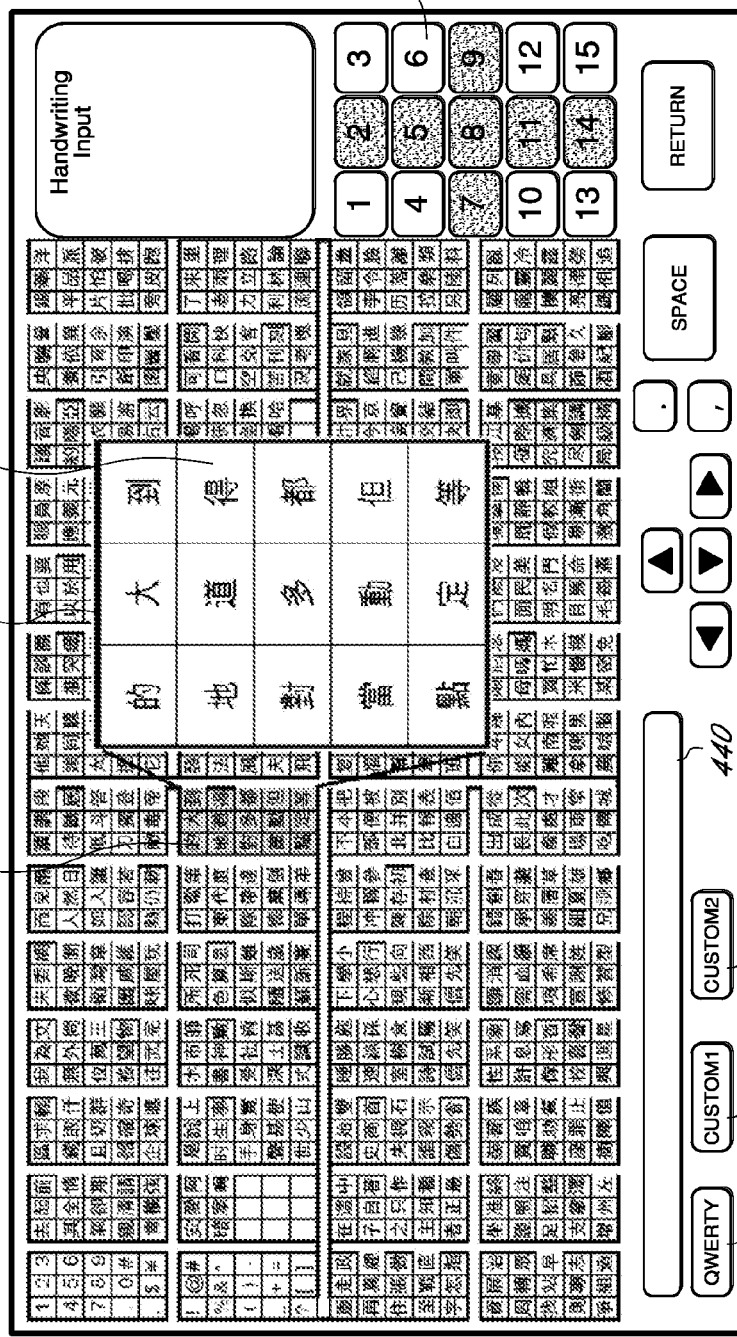
FIG. 6 illustrates the operation of the touchscreen display of the input device of FIG. 1, in which a magnifying window is activated upon touching a character key region according to one embodiment of the invention.

Referring to FIG. 6, a method of inputting a character using the input device 130 described above in connection with FIGS. 1-5 will be described. The method will be described with an example of inputting characters, using the homepage described above in connection with FIGS. 4A-4C. However, the same method can be used with any of the additional pages described herein.

As described above, characters are positioned in the character key regions 411 arranged corresponding to the QWERTY layout. Thus, a user who is aware of the first phonetic sound of a desired character can locate one or more character key regions 411 that may contain the character, based on the background color layer and/or the letters lying behind the character key regions 411. Then, the user can look for the character within the located character key regions 411.

Once the user has found the character, he or she can touch the character key region that contains the character. When the character key region is touched, a magnifying window 414 appears on the touchscreen display 210, as shown in FIG. 6. The user can select the character by touching the character on the magnifying window 414. For example, the user can select a character "得" (having a meaning, or translation, of "to obtain") by touching a cell 414a containing the character "得." In another embodiment, the selected key region 411 can also highlight or blink upon being touched.

The magnifying window 414 can disappear upon a second touch on the same character key region 411, or if a character is selected from the magnifying window 414. In some embodiments, the magnifying window 414 can automatically disappear if there is no selection of a character within a selected period of time, for example, about 3 seconds to about 5 seconds. In other embodiments, if the user desires to select more than one character from a particular character key region 411, the user can continue to touch down the character key region 411 with a finger to keep the magnifying window 414 from disappearing.

Alternatively, the user can select the desired character using the selection pad 420. As described above, the selection pad 420 includes selection keys arranged corresponding to the cells of a character key region 411. Because the magnifying window 414 has the same layout as that of the character key region 411, the selection pad 420 also has the same layout as the magnifying window 414. A user can determine the corresponding location of the character on the selection pad 420 by comparing the magnifying window 414 with the selection pad 420. For example, in FIG. 6, the character "得" is at the corresponding location of the number "6" on the selection pad 420. The user can select the character "得" by touching the number "6" on the selection pad 420. In some embodiments, a selected key region is highlighted without generating a magnifying window. In such embodiments, a desired character in the selected key region can be selected, only using the selection pad 420. Advantageously, the selection pad 420 allows "two-handed" operation of the input device 130, which can increase the speed of inputting characters. For example, the user's left-hand can be used to select a region while the right hand can quickly select a character in that region by using the selection pad 420.

In some embodiments, to aid the user in, e.g., selecting words formed by plurality of characters or to increase the speed of writing, the input device 130 can provide a list of common and likely next characters or words after a character is inputted. The next character can be a likely character following the selected character, for example, to form a word defined by compound characters. An example of such a word would be the word for "man" ("男" or "nán"). This character would then have the characters for "person" ("人" or "rén") or "child" ("孩子" or "háizi") as an option to select for the likely next character or characters. Alternatively, the next character may be a word that commonly follows another word, as determined by general usage, or by analysis of the user's word choices. In one embodiment, such a list of next characters or words can appear on the screen of a display device (for example, the display device 110 of FIG. 1) with numbers assigned to the characters or words. A user can select one of the next characters by selecting one of the numbers, using the selection pad 420.

Figure 7A:
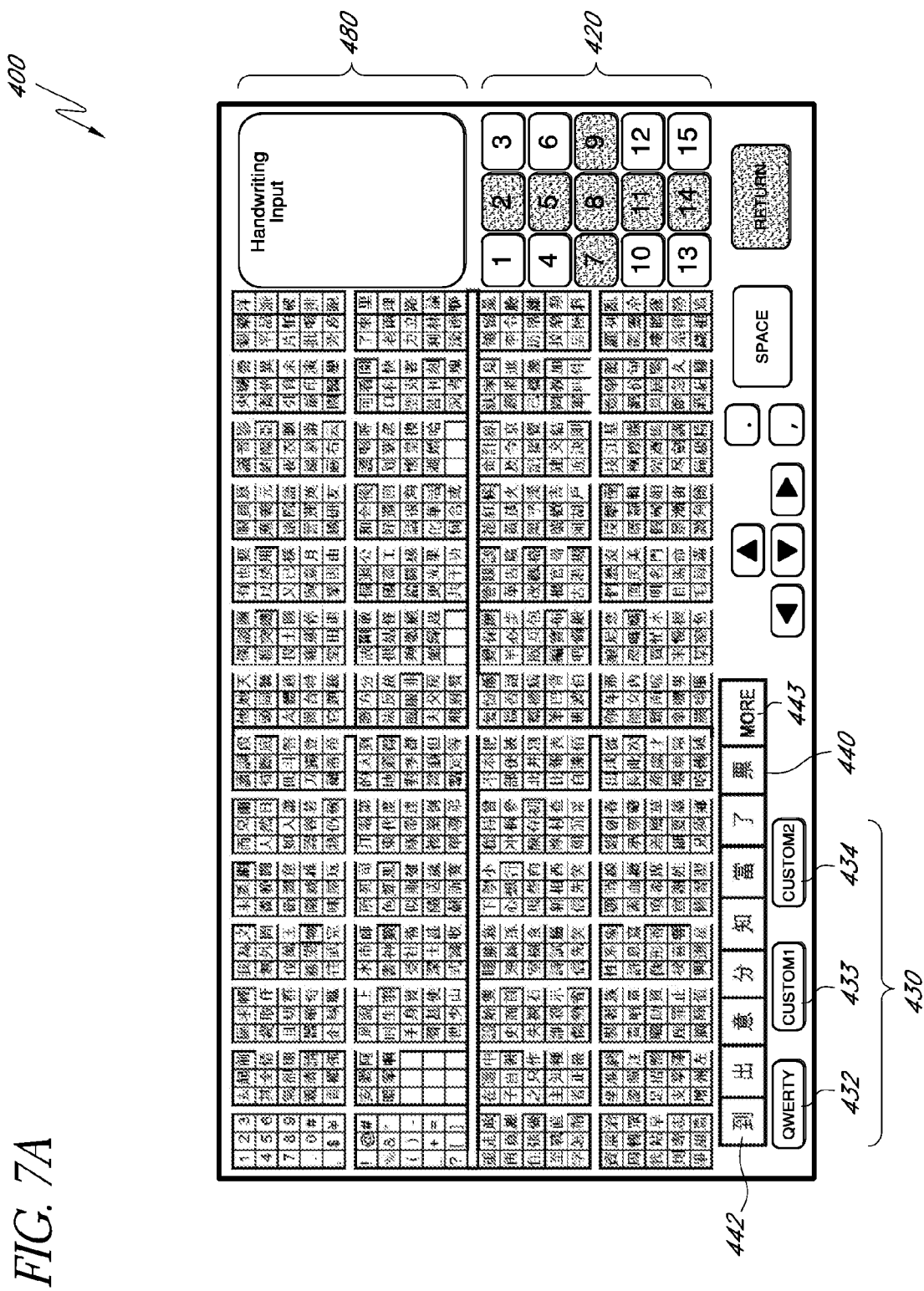
FIG. 7A illustrates the operation of the touchscreen display of the input device of FIG. 1, in which a next character region is activated upon touching a next character region according to one embodiment of the invention.

Referring to FIG. 7A, a method of selecting a next character according to one embodiment is illustrated. In the illustrated embodiment, after a user selects a character by one of the methods described herein, the next character region 440 automatically displays a list of common and likely next characters or words which appears on the displayed page of the touchscreen display 210. The next character region 440 can assume various orientations including a horizontal row or vertical column, e.g., a horizontal column at the top of the home page or a vertical column between the characters and the handwriting input pad 480. In some embodiments, the next character region 440 can display the next characters in a grid (e.g., a 3×5 grid) corresponding to the keypad 420, to optionally allow next character selection using the keypad 420. The user can touch a desired one of the next characters to select it. If the list does not contain the desired next character, the user can touch a "MORE" button 443 to display one or more additional lists of next characters.

Figure 7B:
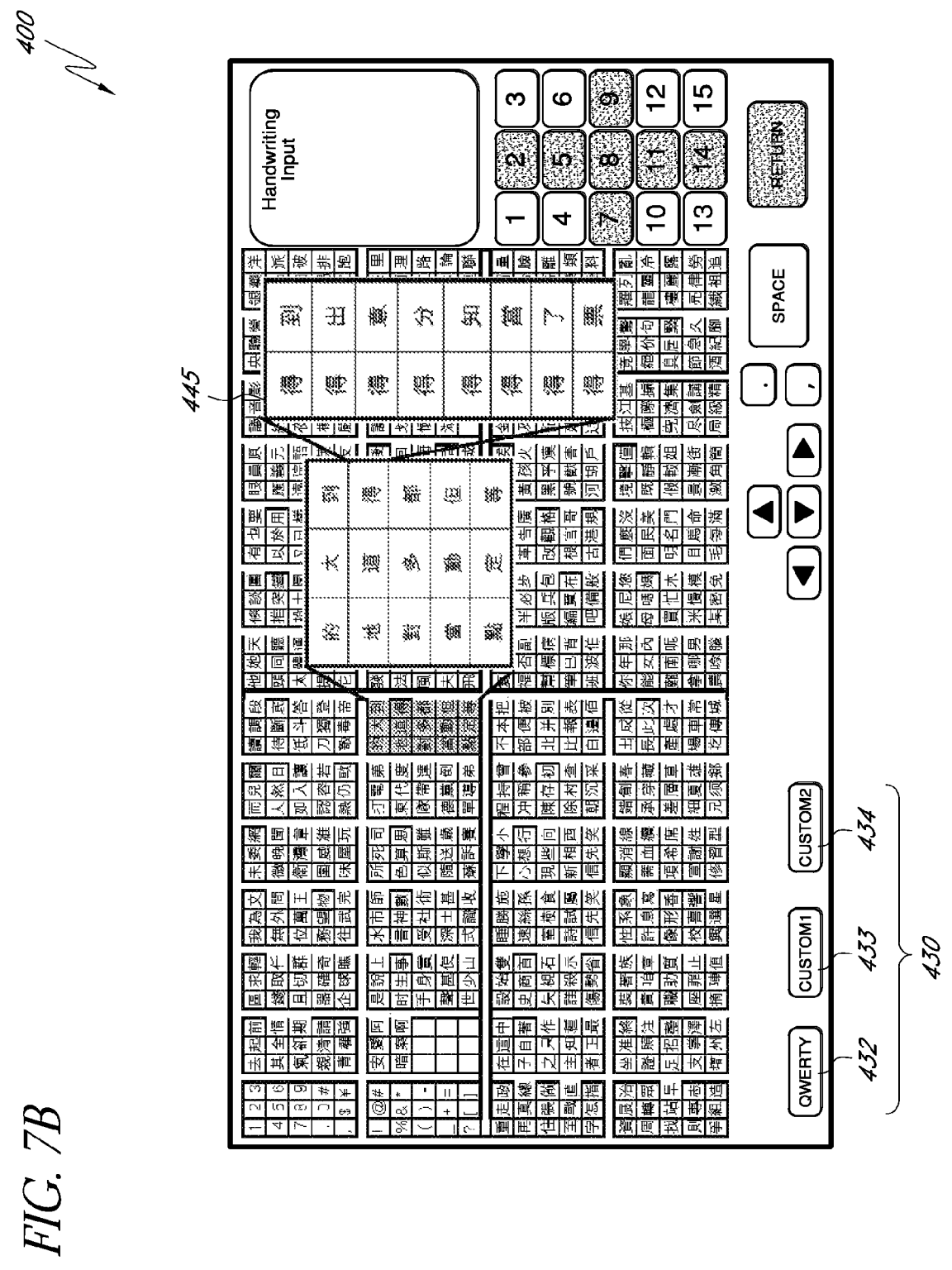

Referring to FIG. 7B, a method of selecting a next character according to another embodiment will be described below. In the illustrated embodiment, a character can be selected by one of the methods described earlier, for example, using a magnifying window 414. In preferred embodiments, upon selection of the character, a next character window 445 can automatically appear as a default, as shown in FIG. 7B, with or without turning off the magnifying window 414. The next character window 445 can contain a list of words that contain the selected character. In another embodiment, the next character window 445 can be generated by touching the desired character for a first duration (for example, about 2 seconds) longer than a second duration (for example, about 0.5 second) required for selecting the character only. In yet another embodiment, the next character window 445 can be generated by double touching the desired character similar to double-clicking with a mouse. The user can select a desired next character by touching it on the next character window 445.

Figure 7C:
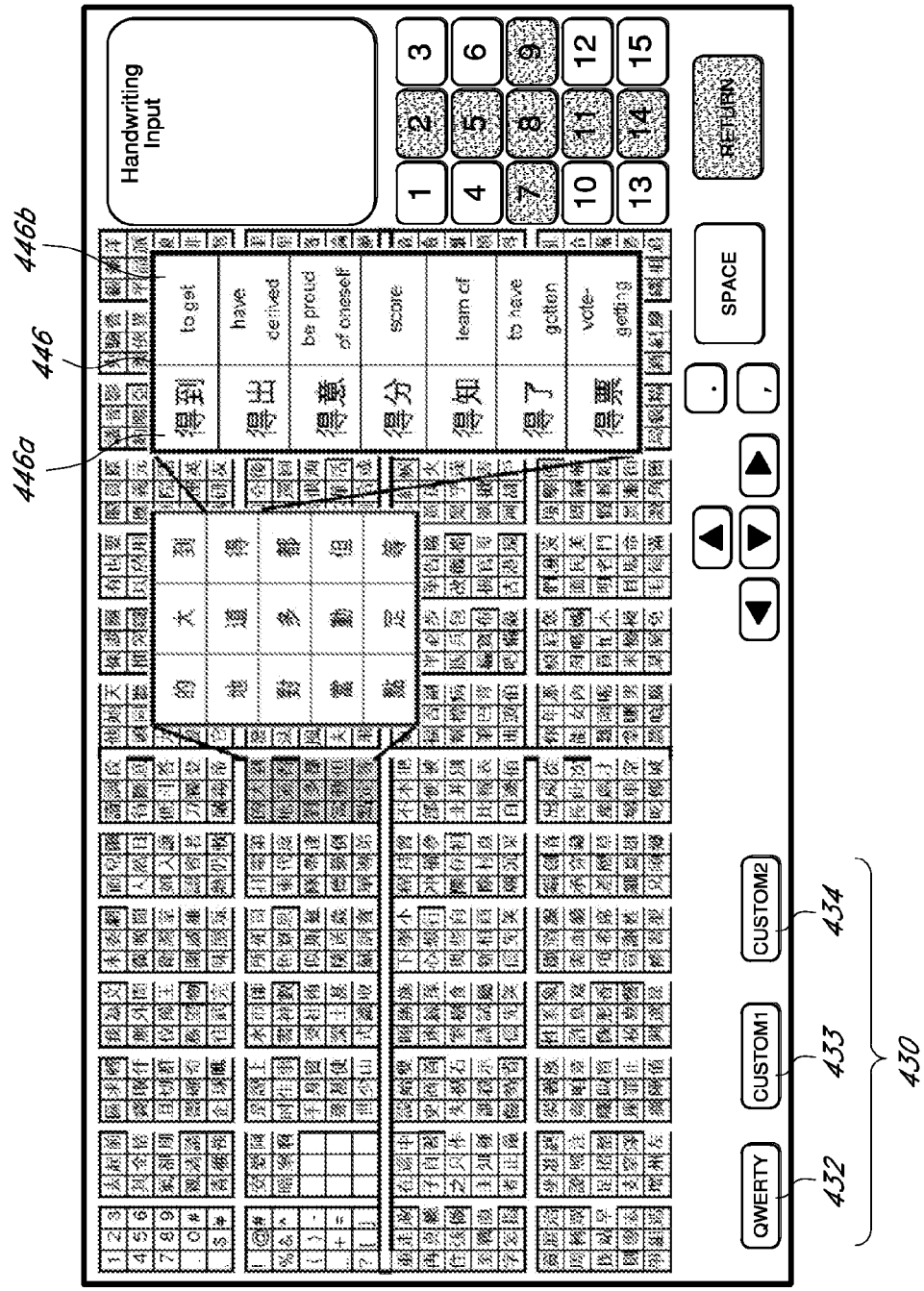
FIG. 7C illustrates the operation of the touchscreen display of the input device of FIG. 1, in which a next character region is activated upon touching a character on a magnifying window according to yet another embodiment of the invention.

Referring to FIG. 7C, a method of selecting a next character according to yet another embodiment will be described below. In the illustrated embodiment, a character can be selected by one of the methods described earlier. In addition, a next character window 446 can be generated by any of the methods described above in connection with FIGS. 7A and 7B. The next character window 446 contains a list of completed words 446a containing the selected character and their translations 446b in the user's native language. The user can select a desired word by touching it on the next character window 446.

Figure 7D:
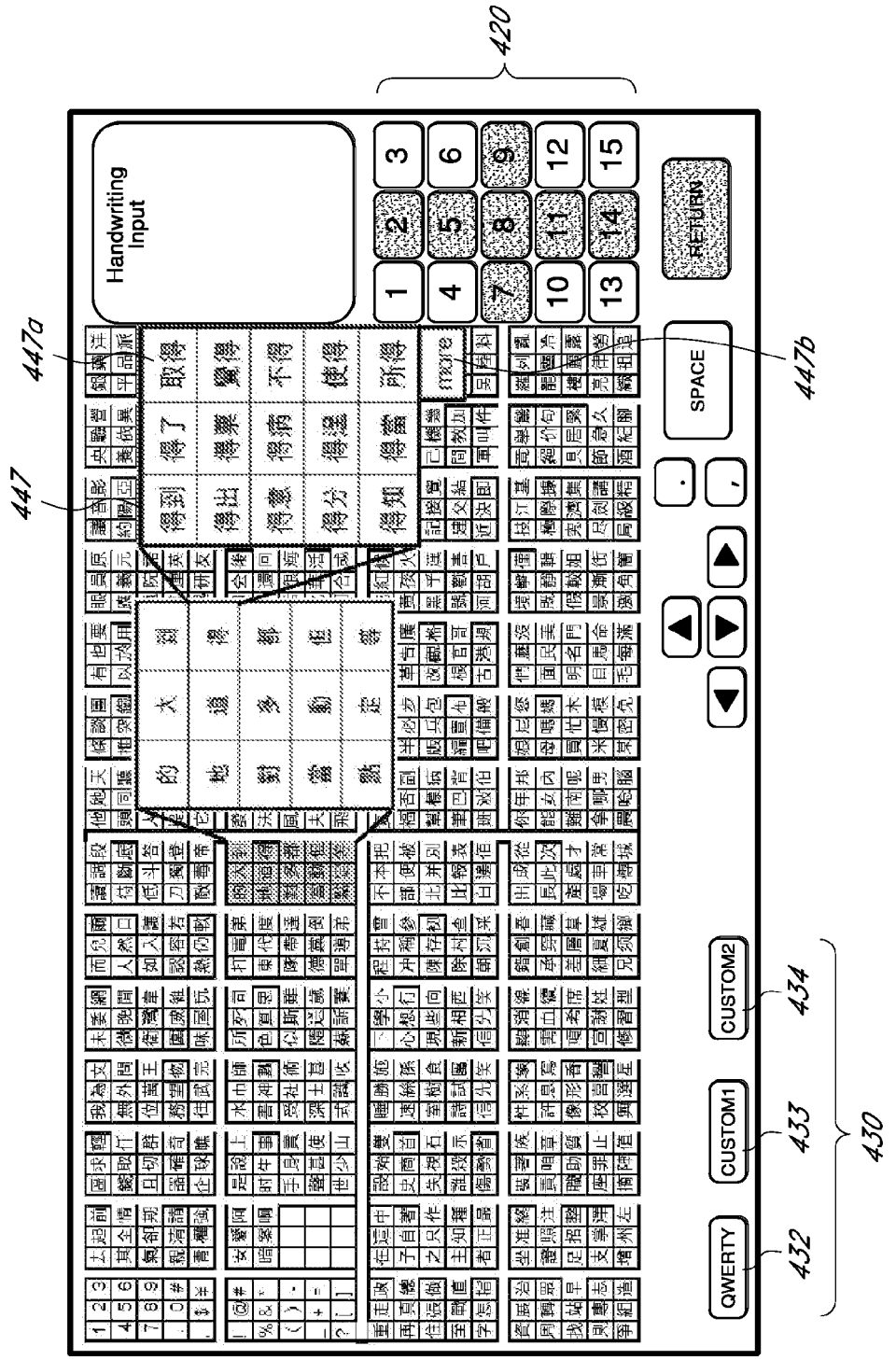
FIG. 7D illustrates the operation of the touchscreen display of the input device of FIG. 1, in which a next character region containing English translation is activated upon touching a character on a magnifying window according to yet another embodiment of the invention.

Referring to FIG. 7D, a method of selecting a next character according to yet another embodiment will be described below. In the illustrated embodiment, a character can be selected by one of the methods described earlier. In addition, a next character window 447 can be generated by any of the methods described above in connection with FIGS. 7A and 7B. The next character window 447 contains an array of completed words 447a containing the selected character. The next character window 447 can have the same arrangement as the selection pad 420. The user can select a desired word by touching either the word on the next character window 447 or the corresponding selection key on the selection pad 420. If the next character window 447 does not contain a desired word, the user can touch a "MORE" button 447b to display an additional list of completed words containing the selected character.

In the embodiments described herein, each of the additional pages (for example, custom pages) is accessible by touching one of the page selection buttons 430. In some embodiments, characters on the additional pages can be accessed without using the page selection buttons 430.

Figure 8A:
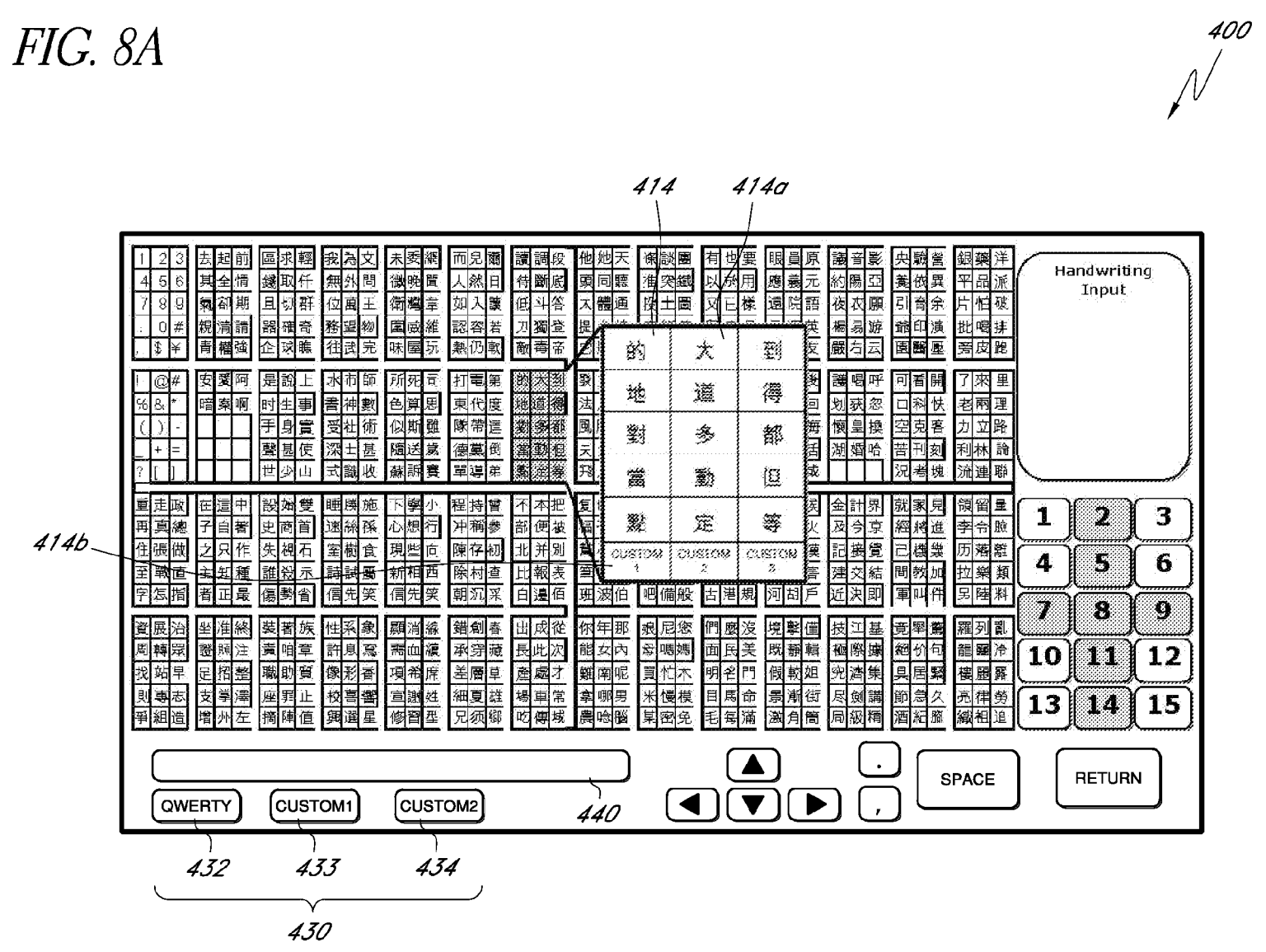
Figure 8B:
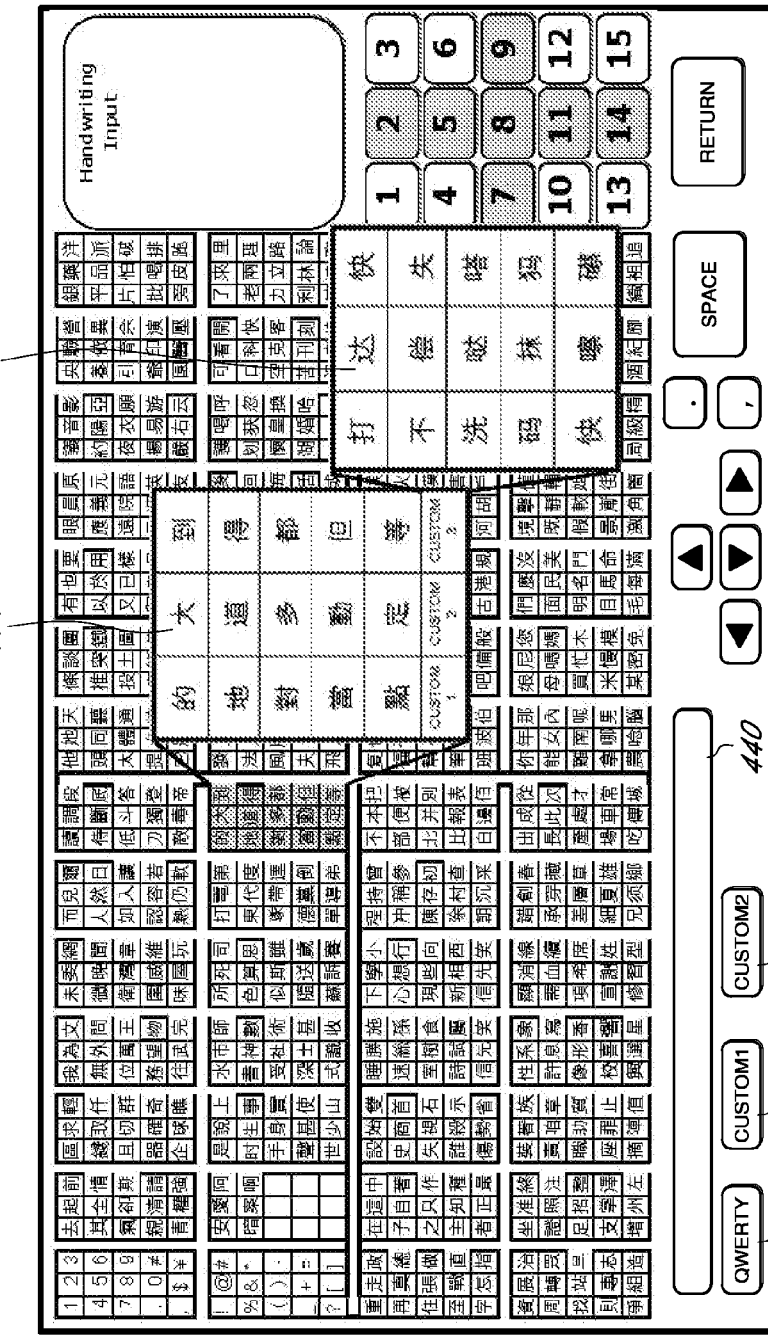

Referring to FIGS. 8A and 8B, a method of inputting a character on one of the additional pages according to one embodiment will be described below. When a character key region is touched, a magnifying window 414 appears on the touchscreen display 210, as shown in FIG. 8A. The magnifying window 414 can include custom page shortcut buttons 414b in addition to characters 414a. A user can access characters on any of the additional pages by touching the desired shortcut button 414b. Then, another magnifying window 416 appears on the touchscreen display 210. The other magnifying window 416 can have the same characters as would be displayed on the corresponding character key region in a similar location on an additional page.

It will be appreciated that the input scheme and display pages described herein can be implemented on non-touch screen displays. For example, the pages containing characters and associated regions can be shown on a display device and a connected keyboard and/or mouse can be used to make the selections otherwise made by touching the screen. For example, referring to FIG. 9, an input device for a pictographic language, using a conventional computer system, is shown. The illustrated computer system 900 can include a monitor 910, a keyboard 920, and a general purpose computer (not shown). The monitor 910 can be, for example, an LCD monitor or a CRT monitor. The keyboard 920 can be a conventional keyboard, such as a QWERTY keyboard. The computer can be of any suitable type, for example, a desktop computer. In other embodiments, the conventional computer system can be implemented in the form of laptop computer, which includes a monitor and a keyboard integrated with a computer. Thus, the input device 130 can advantageously be implemented as a physical touchscreen keyboard in some embodiments. In some other embodiment the input device for pictographic languages can be a virtual keyboard.

In the illustrated embodiment, a Chinese character input software program displaying a virtual keyboard 930 is provided to implement a Chinese character input device with the computer system 900. The virtual keyboard 930 can be operated using the monitor 910 and the keyboard 920 as a user interface, instead of a touchscreen display. The illustrated virtual keyboard 930 includes a window that displays an array 931 of key regions 932, page selection buttons 934, and a next character selection region 936.

In the illustrated embodiment, the program for the virtual keyboard 930 is stored in a hard disk drive of the computer, and is run when the program is executed by a user. In another embodiment, the virtual keyboard 930 may be stored in a remotely located server that can be connected to the computer, and can be downloaded to and executed by the computer.

The array 931 of key regions includes a plurality of character key regions 932 that are generally arranged in a matrix form. In the illustrated embodiment, the array 931 includes 26 character key regions 932 arranged corresponding to the layout of character keys 922 on the keyboard 920.

Each of the key regions 932 can include a grid including cells 933 arranged in a matrix form. Each of the cells 933 can display one of characters. In the illustrated embodiment, each of the key regions 932 includes 3 columns and 4 rows of cells. The number and arrangement of the cells 933 of the key regions 932 correspond to those of numeric keys 924 on the keyboard 920. The numeric keys 924 can includes separate keys for numbers 0 to 9, and ".".

Figure 9:
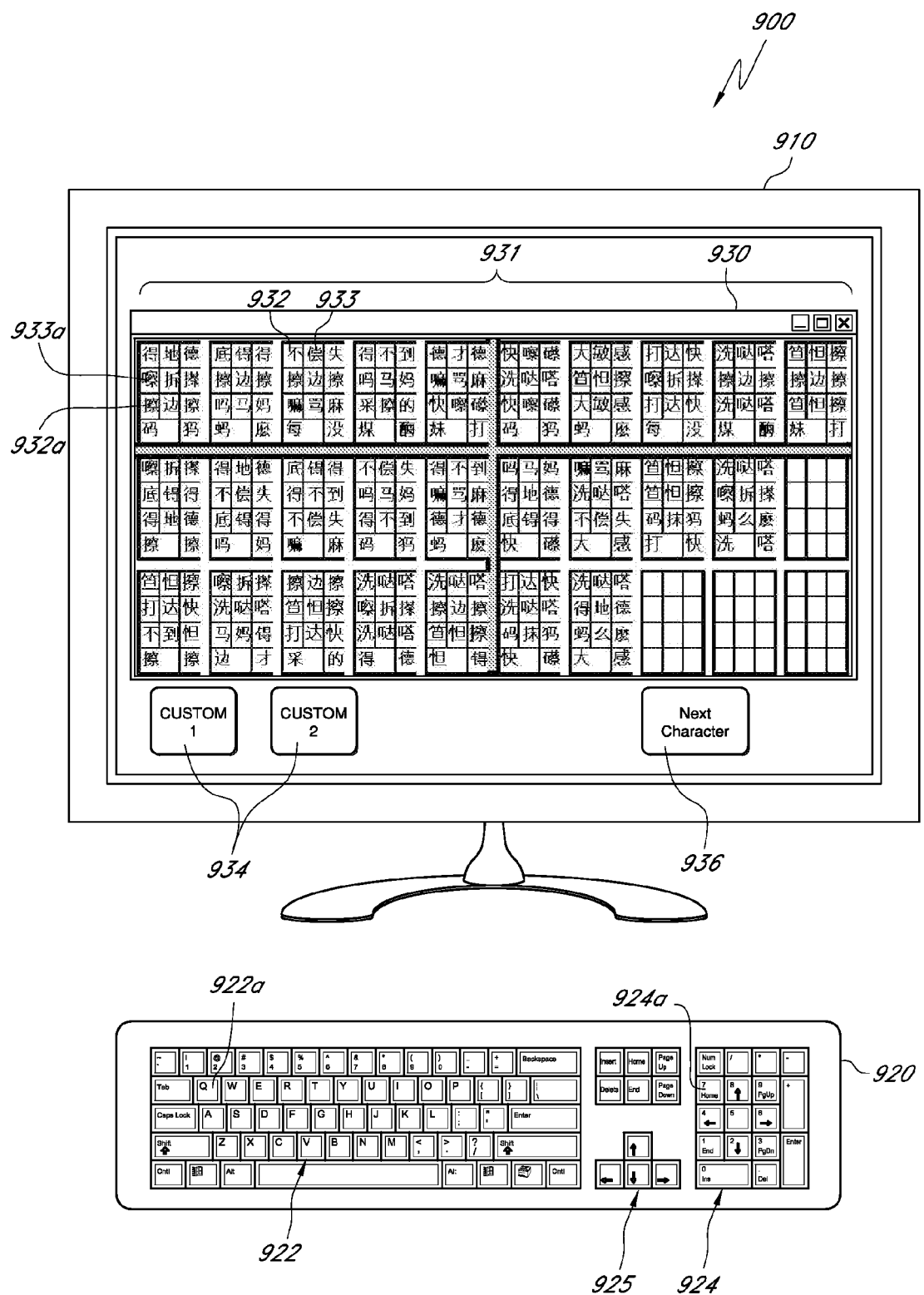
FIG. 9 illustrates a computer monitor and a standard English keyboard, where the computer monitor displays a software-implemented input device for Chinese characters according to one embodiment of the invention.

FIG. 9 only shows a homepage of the virtual keyboard 930. However, the virtual keyboard 930 can include additional pages, as described above in connection with, for example, FIG. 5. Such additional pages can be accessed by clicking on one of the page selection buttons 934. Other details of the homepage and additional pages can be described above in connection with FIGS. 4A-5.

During operation, when a user desires to input the character, the user can locate the character displayed by the window of the input program 930. It will be appreciated that the characters are organized based on the first phonetic sound of the character. Because characters are grouped into character key regions 932 arranged corresponding to the QWERTY layout, a user who knows how the character is pronounced may locate it based on pronunciation. Once the user has located the key region containing the character, the user can select the key region by striking a key on the keyboard 920 that corresponds to the key region.

For example, if a desired character, for example, "得," is in the key region 933a at a first row and a first column (which corresponds to the "Q" key 922a of the keyboard 920), the user can select the key region 933a by striking the "Q" key 922a of the keyboard 920. Then, a magnifying window can appear on the monitor, as described above in connection with FIG. 6. Alternatively, the selected key region 933a can be highlighted or blink.

Then, the user may select the desired character by striking a number key corresponding to the cell containing the desired character. For example, if the desired character, for example, "得," is in a cell 933a at the first row and first column of the selected key region 933a, the user can select the character by striking the "7" key 924a on the keyboard 920. Alternatively, the desired region and/or character can be selected, using a mouse (not shown), or directional keys 925 and the enter key on the keyboard 920. Other details of selecting characters can be as described earlier in connection with FIG. 6.

In addition, the virtual keyboard 930 can provide a next likely character function as described above in connection with FIGS. 7A-7D. The user can invoke this function by clicking the next character region 936. Alternatively, the function can be automatically invoked when appropriate or when it is set up by the user. When the function is invoked, a desired next character can be selected by using the numeric keys 924 on the keyboard 920, or a mouse or the directional keys 925. Other details of the next likely character function can be as described earlier in connection with FIGS. 7A-7D.

The additional pages provided by the virtual keyboard 930 can also be accessed, as described above in connection with FIGS. 8A and 8B. A desired next character can be selected by using a mouse or the directional keys 925. Other details of accessing the additional pages can be as described earlier in connection with FIGS. 8A and 8B.

For ease of description, the embodiments above have been described with reference to written Chinese. In other embodiments, the input device can be adapted for other languages that use Chinese characters, for example, Japanese and Korean. In certain embodiments, the input device can also be adapted for any other pictographic language.

Advantageously, preferred embodiments of the invention allow a user to input pictographic characters without needing to know how to write the characters. Knowledge of the pronunciation of the character and a rough knowledge of the appearance of the character are sufficient for a user to use embodiments of the invention to communicate via the written form of the pictographic language. Moreover, the placement of characters on the input device is preferably standardized, so that a user can quickly locate a word and also associate a particular location with a particular character, thereby increasing the speed of character entry as the user becomes more familiar with the keyboard.

In at least some of the aforesaid embodiments, any element used in an embodiment can interchangeably be used in another embodiment or may be omitted unless such a replacement or omission is not feasible. It will be appreciated by those skilled in the art that various other omissions, additions and modifications may also be made to the methods and structures described above without departing from the scope of the invention. All such modifications and changes are intended to fall within the scope of the invention, as defined by the appended claims.

We claim:

1. A touchscreen keyboard for a pictographic language, comprising:
   a touchscreen display; and
   a display controller programmed to display a first arrangement of pictographic characters on the touchscreen display, the first arrangement comprising a plurality of characters of the pictographic language, wherein the first arrangement comprises a plurality of discrete regions arranged in a matrix form, each of the regions displaying a respective one of groups of characters selected from the plurality of characters, each of the regions including 15 characters arranged in 3 columns and 5 rows, wherein the display controller is further programmed to display characters in a matrix form in a respective one of the regions, wherein characters in at least one of the regions have the same first phonetic sound as one another, and wherein the regions are arranged at positions corresponding to positions of keys of a QWERTY keyboard, such that the first phonetic sounds of the characters of the regions substantially correspond to the phonetic sounds of letters on the keys of the QWERTY keyboard.

2. The system of claim 1, wherein the pictographic characters are Chinese characters.

3. The touchscreen keyboard of claim 1, wherein characters in two or more of the regions have the same first phonetic sound, and wherein the two or more regions are arranged immediately adjacent to one another.

4. The touchscreen keyboard of claim 1, wherein the display controller is further programmed to display a background phonetic character in the at least one of the regions, wherein a background color represents the first phonetic sound of the characters displayed by the at least one region.

5. The touchscreen keyboard of claim 1, wherein at least one of the regions has a background color different from background colors of the other regions.

6. The touchscreen keyboard of claim 1, wherein the first arrangement displays at least 800 characters.

7. The touchscreen keyboard of claim 1, wherein the display controller is further programmed to display a second arrangement including a second set of characters on the touchscreen display in place of the first arrangement.

8. The touchscreen keyboard of claim 7, wherein the display controller is further programmed to allow a user to customize characters on the second arrangement.

9. The touchscreen keyboard of claim 7, wherein the display controller is further programmed to display industry-specific characters on the second arrangement.

10. The touchscreen keyboard of claim 1, wherein upon receiving the selection of a region, the display controller is further programmed to display a magnifying window on the touchscreen display, the magnifying window containing magnified characters of the selected region, and to receive the selection of the one of the characters by receiving a touch on the character on the magnifying window.

11. The touchscreen keyboard of claim 1, wherein the display controller is further programmed to display a selection pad including numeric keys on the touchscreen display, and to receive the selection of the one of the characters by receiving a touch on one of the numeric keys on the selection pad.

12. The touchscreen keyboard of claim 1, wherein the display controller is further programmed to display a plurality of likely characters that are likely to follow the selected character on the touchscreen display, and to receive selection of one of the likely characters by receiving a touch on one of the likely characters.

13. The touchscreen keyboard of claim 1, further comprising at least one of a speaker, a headphone jack, or a microphone.

14. The touchscreen keyboard of claim 1, further comprising: a microphone; and a speech recognition software program to recognize a character or word spoken to the microphone, wherein the display controller is programmed to highlight a character recognized by the speech recognition software program on the touchscreen display.

15. The touchscreen keyboard of claim 1, further comprising a stylus pad programmed to recognize strokes provided to the stylus pad.

16. The touchscreen keyboard of claim 1, wherein the system is further programmed to generate a pronunciation of the selected character.

17. An input system for a pictographic language, the system comprising:
a touchscreen display; and
a display controller programmed to display a first arrangement of pictographic characters on the touchscreen display, the first arrangement comprising a plurality of characters of the pictographic language, wherein the first arrangement comprises a plurality of discrete regions, each of the regions displaying a respective one of groups of characters selected from the plurality of characters, wherein the display controller is programmed to receive selection of one of the regions by receiving a touch on the selected region of the touchscreen display, and to receive selection of a character in the selected region after receiving the selection of the region, and wherein the regions are arranged at positions corresponding to positions of keys of a standard Roman character keyboard, such that the first phonetic sounds of the characters of the regions substantially correspond to the phonetic sounds of characters on the keys of the standard Roman character keyboard.

18. The system of claim 17, wherein the pictographic language is written Chinese.

19. The system of claim 17, wherein the standard Roman character keyboard comprises a QWERTY keyboard.

20. The system of claim 17, wherein the standard Roman character keyboard comprises one of a Dvorak keyboard, a QWERTZ keyboard, or an AZERTY keyboard.

21. The system of claim 17, wherein characters in two or more of the regions have the same first phonetic sound, and wherein the two or more regions are arranged immediately adjacent to one another.

22. The system of claim 17, wherein the display controller is further programmed to display a background phonetic character in the at least one of the regions, wherein a the background color represents the first phonetic sound of the characters displayed by the at least one region.

23. The system of claim 17, wherein at least one of the regions has a background color different from background colors of the other regions.

24. The system of claim 17, wherein the touchscreen display includes at least one protrusion at a position at which one of the regions is displayed.

25. The system of claim 17, wherein the first arrangement displays at least 800 characters.

26. The system of claim 17, wherein each of the regions includes 15 characters.

27. The system of claim 26, wherein the 15 characters are arranged in 3 columns and 5 rows.

28. The system of claim 17, wherein the display controller is further programmed to display a second arrangement including a second set of characters of the pictographic language on the touchscreen display in place of the first arrangement.

29. The system of claim 28, wherein the display controller is further programmed to allow a user to customize characters on the second arrangement.

30. The system of claim 28, wherein the display controller is further programmed to display industry-specific characters on the second arrangement.

31. The system of claim 17, wherein the display controller is further programmed to display a magnifying window on the touchscreen display, the magnifying window containing magnified characters of the selected region upon receiving the selection of the region, and to receive the selection of the one of the characters by receiving a touch on the character on the magnifying window.

32. The system of claim 17, wherein the display controller is further programmed to display a selection pad including numeric keys on the touchscreen display, and to receive the selection of the one of the characters by receiving a touch on one of the numeric keys on the selection pad.

33. The system of claim 17, wherein the display controller is further programmed to display a plurality of likely characters that are likely to follow the selected character on the touchscreen display, and to receive selection of one of the likely characters by receiving a touch on one of the likely characters.

34. The system of claim 17, wherein the display controller is further programmed to display a plurality of words containing the selected character on the touchscreen display, and to receive selection of one of the words by receiving a touch on one of the words.

35. The system of claim 17, further comprising at least one of a speaker, a headphone jack, or a microphone.

36. The system of claim 17, further comprising: a microphone; and a speech recognition software program to recognize a character or word spoken to the microphone, wherein the display controller is programmed to highlight a character recognized by the speech recognition software program on the touchscreen display.

37. The system of claim 17, further comprising a stylus pad programmed to recognize strokes provided to the stylus pad.

38. The system of claim 17, wherein the system is further programmed to generate a pronunciation of the selected character.

39. The system of claim 17, further comprising one or more of a monitor and a CPU.

40. A non-transitory computer readable medium having stored thereon instructions that, when executed, direct a touchscreen display device to:
  display a first arrangement comprising a plurality of characters of a pictographic language, wherein the first arrangement comprises a plurality of regions, each of the regions displaying a respective one of groups of characters selected from the plurality of characters, wherein the regions are arranged at positions corresponding to positions of keys of a standard Roman character keyboard, such that the first phonetic sounds of the characters of the regions substantially correspond to the phonetic sounds of characters on the keys of the standard Roman character keyboard;
  receive selection of one of the regions; and
  receive selection of one of the characters in the selected region after receiving the selection of the region.

41. An input system for a pictographic language comprising:
  a monitor;
  a standard Roman character keyboard including character keys and numeric keys; and
  a display controller programmed to display a first arrangement comprising a plurality of characters of a pictographic language on the monitor, wherein the arrangement comprises a plurality of regions, each of the regions displaying a respective one of groups of characters selected from the plurality of characters, wherein the regions are arranged at positions corresponding to positions of keys of the standard Roman character keyboard, such that the first phonetic sounds of the characters of the regions substantially correspond to the phonetic sounds of characters on the keys of the standard Roman character keyboard,
  wherein the system is further programmed to receive selection of one of the regions via one of the character keys of the keyboard, and to receive selection of one of the characters in the selected region via one of the numeric keys of the keyboard.

42. A system for inputting a pictographic language, the system comprising:
  a server in data communication with an end user device including a monitor; and
  a software program stored in the server, the software program being downloadable to the end user device, the software program including instructions that, when executed, direct the end user device to:
    display a first arrangement comprising a plurality of characters of a pictographic language on the monitor, wherein the first arrangement comprises a plurality of regions, each of the regions displaying a respective one of groups of characters selected from the plurality of characters, wherein the regions are arranged at positions corresponding to positions of keys of a standard Roman character keyboard, such that the first phonetic sounds of the characters of the regions substantially correspond to the phonetic sounds of characters on the keys of the standard Roman character keyboard;
    receive selection of one of the regions; and
    receive selection of one of the characters in the selected region after receiving the selection of the region.

43. A method of inputting characters of a pictographic language into an electronic device, the method comprising:
  selecting one of the regions of the touchscreen display of the touchscreen keyboard of claim 1, the one of the regions containing a desired character; and
  selecting the desired character by touching a selected region on the touchscreen display.

44. The method of claim 43, wherein the display controller of the touchscreen keyboard is further programmed to display a magnifying window on the touchscreen display, the magnifying window containing magnified characters of the selected region upon receiving the selection of the region, and
  wherein selecting the desired character comprises touching the desired character displayed on the magnifying window.

45. The touchscreen keyboard of claim 43, wherein the display controller of the touchscreen keyboard is further programmed to display a selection pad including numeric keys on the touchscreen display, and
  wherein selecting the desired character comprises touching one of the numeric keys on the selection pad.

* * * * *